United States Patent
Kobayashi et al.

(10) Patent No.: US 12,236,357 B2
(45) Date of Patent: Feb. 25, 2025

(54) GENERATING A SEQUENCE RULE

(71) Applicant: International Business Machines Corporation, Armonk, NY (US)

(72) Inventors: Hiromi Kobayashi, Tokyo (JP); Yasue Makino, Tokyo (JP); Yusuke Matsumoto, Tokyo (JP); Hirokazu Kobayashi, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1441 days.

(21) Appl. No.: 16/242,456

(22) Filed: Jan. 8, 2019

(65) Prior Publication Data

US 2020/0218994 A1 Jul. 9, 2020

(51) Int. Cl.
*G06Q 20/00* (2012.01)
*G06F 40/20* (2020.01)
(Continued)

(52) U.S. Cl.
CPC .............. *G06N 5/025* (2013.01); *G06F 40/20* (2020.01); *G06N 20/00* (2019.01); *G06Q 30/0202* (2013.01); *H04L 67/12* (2013.01)

(58) Field of Classification Search
CPC ........ G06N 5/025; G06N 20/00; G06F 40/20; H04L 67/12; G06Q 30/0202
See application file for complete search history.

(56) References Cited

U.S. PATENT DOCUMENTS 7,299,194 B1 * 11/2007 Manganaris ........... G06Q 30/02
705/7.29
10,140,820 B1 * 11/2018 Zalewski ........... G06Q 30/0633
(Continued)

OTHER PUBLICATIONS

Identifying Follow-Correlation Itemset-Pairs; Shichao Zhang, Jilian Zhang , Xiaofeng Zhu , Zifang Huang; Department of Computer Science, Guangxi Normal University, China School of Automation Science and Electrical Engineering, Beihang University, Beijing, China. (Year: 2006).*

(Continued)

*Primary Examiner* — Radu Andrei
(74) *Attorney, Agent, or Firm* — Eric Chesley; George S. Blasiak; Heslin Rothenberg Farley & Mesiti PC

(57) ABSTRACT

Methods, computer program products, and systems are presented. The method, computer program products, and systems can include, for instance: performing an association analysis on a transaction dataset to return an association rule, wherein the association analysis is performed independent of timing data indicating a time order of data items for the respective transactions; extracting transaction data defining a set of transactions of the transaction dataset using the association rule, the transaction data including timing data indicating a time order of data items for the set of transactions; examining data of the transaction data using the timing data indicating the time order of data items for transactions of the set of transaction; returning a time ordered sequence rule specifying a time ordered premise and predicted result, wherein the time ordered sequence rule is in dependence on the examining; monitoring activities of a user for occurrence of a condition defining the premise of the sequence rule; and returning an action decision in response an occurrence of the condition.

19 Claims, 8 Drawing Sheets

(51) Int. Cl.
*G06N 5/025* (2023.01)
*G06N 20/00* (2019.01)
*G06Q 30/0202* (2023.01)
*H04L 67/12* (2022.01)

(56) References Cited

U.S. PATENT DOCUMENTS

| | | | | |
|---|---|---|---|---|
| 2003/0046303 | A1* | 3/2003 | Chen | G06Q 10/10 |
| 2010/0318155 | A1* | 12/2010 | Mahajan | A61N 1/37254 607/30 |
| 2011/0119104 | A1* | 5/2011 | Levine | G06Q 30/02 705/412 |
| 2012/0308974 | A1* | 12/2012 | Canali | G16H 50/20 434/236 |
| 2013/0067572 | A1* | 3/2013 | Muramoto | H04L 63/1408 726/22 |
| 2013/0339156 | A1* | 12/2013 | Sanjay | G06Q 30/02 705/14.66 |
| 2014/0148137 | A1* | 5/2014 | Weng | H04W 4/16 455/414.1 |
| 2014/0324537 | A1 | 10/2014 | Gilbert | |
| 2015/0095015 | A1* | 4/2015 | Lani | G06F 17/18 704/9 |
| 2015/0193513 | A1* | 7/2015 | Anuj | G06F 16/245 707/602 |
| 2015/0332296 | A1 | 11/2015 | Chu et al. | |
| 2015/0347645 | A1* | 12/2015 | Carlin | G06F 30/3308 716/102 |
| 2016/0034253 | A1* | 2/2016 | Bang | G06F 9/451 715/728 |
| 2016/0036931 | A1* | 2/2016 | Mathis | H04L 67/535 709/224 |
| 2016/0125247 | A1* | 5/2016 | Fan Chiang | G06F 16/5838 382/103 |
| 2016/0188587 | A1* | 6/2016 | Martin | G06F 16/134 707/734 |
| 2016/0381580 | A1* | 12/2016 | Kwan | H04L 41/16 370/252 |
| 2017/0339007 | A1* | 11/2017 | Wang | H04L 41/065 |
| 2018/0219971 | A1* | 8/2018 | Chen | H04L 65/40 |
| 2018/0260268 | A1* | 9/2018 | Madsen | G06F 11/0727 |
| 2019/0155542 | A1* | 5/2019 | Kim | G06F 13/1652 |

OTHER PUBLICATIONS

Week 13 Mining Association Rules: Seokho Chi, Professor, Ph.D., SNU Construction Innovation Lab; 2006. (Year: 2006).*

Mining Web Log Sequential Patterns with Position Coded Pre-Order Linked WAP-Tree; C.I. Ezeife et al.; Yi Lu School of Computer Science, University of Windsor, Windsor, Ontario, Canada, N9B 3P4; 2005. (Year: 2005).*

CMRULES: An Efficient Algorithm for Mining Sequential Rules Common to Several Sequences; Philippe Fournier-Viger et al. ; 2010. (Year: 2010).*

Sequential Pattern Mining on Library Transaction Data; Imas Sukaesih Sitanggang et al.; IEEE, 2010. (Year: 2010).*

Efficient Analysis of Pattern and Association Rule Mining Approaches; Thabet Slimani et al. 2014. (Year: 2014).*

Knowledge Discovery in Databases SS 2016 Lecture: Chapter 3: Frequent Itemset Mining; Prof. Dr. Thomas Seidl et al. 2016; (Year: 2016).*

Subgroup discovery on Big Data: exhaustive methodologies using Map-Reduce F. Padillo, et al; 2016 IEEE. (Year: 2016).*

A Hybrid Book Recommender System Based on Table of Contents (ToC) and Association Rule Mining Zafar Ali et al.; May 9-11, 2016. (Year: 2016).*

Comparative Study of Frequent Pattern Mining Techniques Gauravjeet Singh et al. Advanced Materials Research; 2012. (Year: 2012).*

Anonymous; Ruled Sequence; ip.com; 6 pages; 2012.*

Thummalapenta; Mining exception-handling rules as sequence rules; ICSE; pp. 496-506; 2009.*

Tian; Unambiguity verification and execution prioritization of rule set; IEEE; pp. 46-51; 2010.*

Subgroup discovery on Big Data: exhaustive methodologies using Map-Reduce F. Padillo, et al; 2016 IEEE.*

Mining Web Log Sequential Patterns with Position Coded Pre-Order Linked W AP-Tree; C.I. Ezeife et al.; Yi Lu School of Computer Science, University of Windsor, Windsor, Ontario, Canada, N9B 3P4; 2005.*

CMRULES: An Efficient Algorithm for Mining Sequential Rules Common to Several Sequences; Philippe Fournier-Viger et al.; 2010.*

Sequential Pattern Mining on Library Transaction Data; Imas Sukaesih Sitanggang et al.; IEEE, 2010.*

Efficient Analysis of Pattern and Association Rule Mining Approaches; Thabet Slimani et al. 2014.*

P. Mell, et al. "*The NIST Definition of Cloud Computing*", NIST Special Publication 800-145, Sep. 2011, Gaithersburg, MD.

C. Rudin, et al. "*Learning Theory Analysis for Association Rules and Sequential Event Prediction*" Journal of Machine Learning Research 14, 3441-3492, (2013).

Hapibot, "*A New Model to Predict what your Customer May do or Buy Next*," Hapibot Journal Jan. 10, 2017.

* cited by examiner

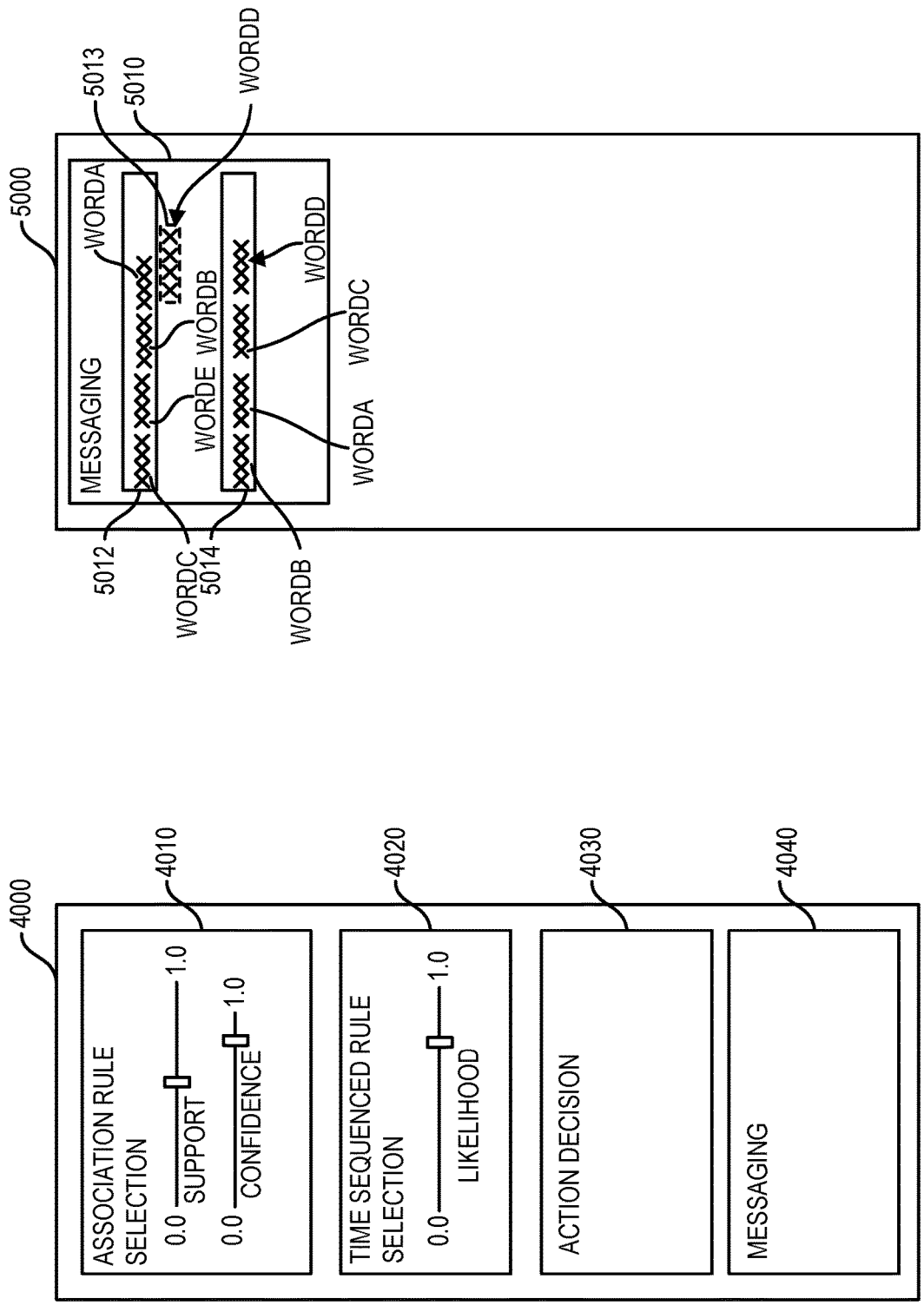

GENERATING A SEQUENCE RULE

BACKGROUND

The present disclosure relates to decision logic, and more particularly to methods, computer program articles, and systems for generating a sequence rule.

Association analysis refers to rules based machine learning methods for the discovery of relationships of interest in large databases. Association analysis identifies associations of events which occur together, i.e. by definition at the same time.

Data structures have been employed for improving operation of computer system. A data structure refers to an organization of data in a computer environment for improved computer system operation. Data structure types include containers, lists, stacks, queues, tables and graphs. Data structures have been employed for improved computer system operation e.g. in terms of algorithm efficiency, memory usage efficiency, maintainability, and reliability.

Artificial intelligence (AI) refers to intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience. Machine learning has been described as the field of study that gives computers the ability to learn without being explicitly programmed.

SUMMARY

Shortcomings of the prior art are overcome, and additional advantages are provided, through the provision, in one aspect, of a method. The method can include, for example: performing an association analysis on a transaction dataset to return an association rule, wherein the association analysis is performed independent of timing data indicating a time order of data items for the respective transactions; extracting transaction data defining a set of transactions of the transaction dataset using the association rule, the transaction data including timing data indicating a time order of data items for the set of transactions; examining data of the transaction data using the timing data indicating the time order of data items for transactions of the set of transaction; returning a time ordered sequence rule specifying a time ordered premise and predicted result, wherein the time ordered sequence rule is in dependence on the examining; monitoring activities of a user for occurrence of a condition defining the premise of the sequence rule; and returning an action decision in response an occurrence of the condition.

In another aspect, a computer program product can be provided. The computer program product can include a computer readable storage medium readable by one or more processing circuit and storing instructions for execution by one or more processor for performing a method. The method can include, for example: performing an association analysis on a transaction dataset to return an association rule, wherein the association analysis is performed independent of timing data indicating a time order of data items for the respective transactions; extracting transaction data defining a set of transactions of the transaction dataset using the association rule, the transaction data including timing data indicating a time order of data items for the set of transactions; examining data of the transaction data using the timing data indicating the time order of data items for transactions of the set of transaction; returning a time ordered sequence rule specifying a time ordered premise and predicted result, wherein the time ordered sequence rule is in dependence on the examining; monitoring activities of a user for occurrence of a condition defining the premise of the sequence rule; and returning an action decision in response an occurrence of the condition.

In a further aspect, a system can be provided. The system can include, for example a memory. In addition, the system can include one or more processor in communication with the memory. Further, the system can include program instructions executable by the one or more processor via the memory to perform a method. The method can include, for example: performing an association analysis on a transaction dataset to return an association rule, wherein the association analysis is performed independent of timing data indicating a time order of data items for the respective transactions; extracting transaction data defining a set of transactions of the transaction dataset using the association rule, the transaction data including timing data indicating a time order of data items for the set of transactions; examining data of the transaction data using the timing data indicating the time order of data items for transactions of the set of transaction; returning a time ordered sequence rule specifying a time ordered premise and predicted result, wherein the time ordered sequence rule is in dependence on the examining; monitoring activities of a user for occurrence of a condition defining the premise of the sequence rule; and returning an action decision in response an occurrence of the condition.

Shortcomings of the prior art are overcome, and additional advantages are provided, through the provision, in one aspect, of a method. The method can include, for example: performing an association analysis on a transaction dataset to return an association rule, wherein the transaction dataset specifies data of a plurality of transactions, wherein respective transactions of the plurality of transactions include timing data indicating a time order of data items, wherein the association analysis is performed independent of the timing data indicating the time order of data items for the respective transactions of the plurality of transactions; extracting transaction data defining a set of transactions of the transaction dataset using the association rule, the transaction data including timing data indicating a time order of data items for respective transactions the set of transactions; examining data of the transaction data to identify for respective transactions of the set of transactions a certain data item of data items defining the respective transaction of the set of transactions, wherein the examining includes using the timing data indicating the time order of data items for respective transactions of the set of transactions; returning a time ordered sequence rule specifying a time ordered premise and predicted result, wherein the time ordered sequence rule is in dependence on the examining; monitoring activities of a user for occurrence of a condition defining the premise of the sequence rule; and returning an action decision in response an occurrence of the condition.

In another aspect, a computer program article can be provided. The computer program article can include a computer readable storage medium readable by one or more processing circuit and storing instructions for execution by one or more processor for performing a method. The method can include, for example: performing an association analysis on a transaction dataset to return an association rule, wherein the transaction dataset specifies data of a plurality of transactions, wherein respective transactions of the plurality of transactions include timing data indicating a time order of data items, wherein the association analysis is performed independent of the timing data indicating the time order of data items for the respective transactions of the plurality of transactions; extracting transaction data defining a set of transactions of the transaction dataset using the association rule, the transaction data including timing data indicating a time order of data items for respective transactions the set of transactions; examining data of the transaction data to identify for respective transactions of the set of transactions a certain data item of data items defining the respective transaction of the set of transactions, wherein the examining includes using the timing data indicating the time order of data items for respective transactions of the set of transactions; returning a time ordered sequence rule specifying a time ordered premise and predicted result, wherein the time ordered sequence rule is in dependence on the examining; monitoring activities of a user for occurrence of a condition defining the premise of the sequence rule; and returning an action decision in response an occurrence of the condition.

In a further aspect, a system can be provided. The system can include, for example a memory. In addition, the system can include one or more processor in communication with the memory. Further, the system can include program instructions executable by the one or more processor via the memory to perform a method. The method can include, for example: performing an association analysis on a transaction dataset to return an association rule, wherein the transaction dataset specifies data of a plurality of transactions, wherein respective transactions of the plurality of transactions include timing data indicating a time order of data items, wherein the association analysis is performed independent of the timing data indicating the time order of data items for the respective transactions of the plurality of transactions; extracting transaction data defining a set of transactions of the transaction dataset using the association rule, the transaction data including timing data indicating a time order of data items for respective transactions the set of transactions; examining data of the transaction data to identify for respective transactions of the set of transactions a certain data item of data items defining the respective transaction of the set of transactions, wherein the examining includes using the timing data indicating the time order of data items for respective transactions of the set of transactions; returning a time ordered sequence rule specifying a time ordered premise and predicted result, wherein the time ordered sequence rule is in dependence on the examining; monitoring activities of a user for occurrence of a condition defining the premise of the sequence rule; and returning an action decision in response an occurrence of the condition.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 4 depicts an administrator user interface according to one embodiment;

FIG. 5 depicts a user interface according to one embodiment;

DETAILED DESCRIPTION

Figure 1:
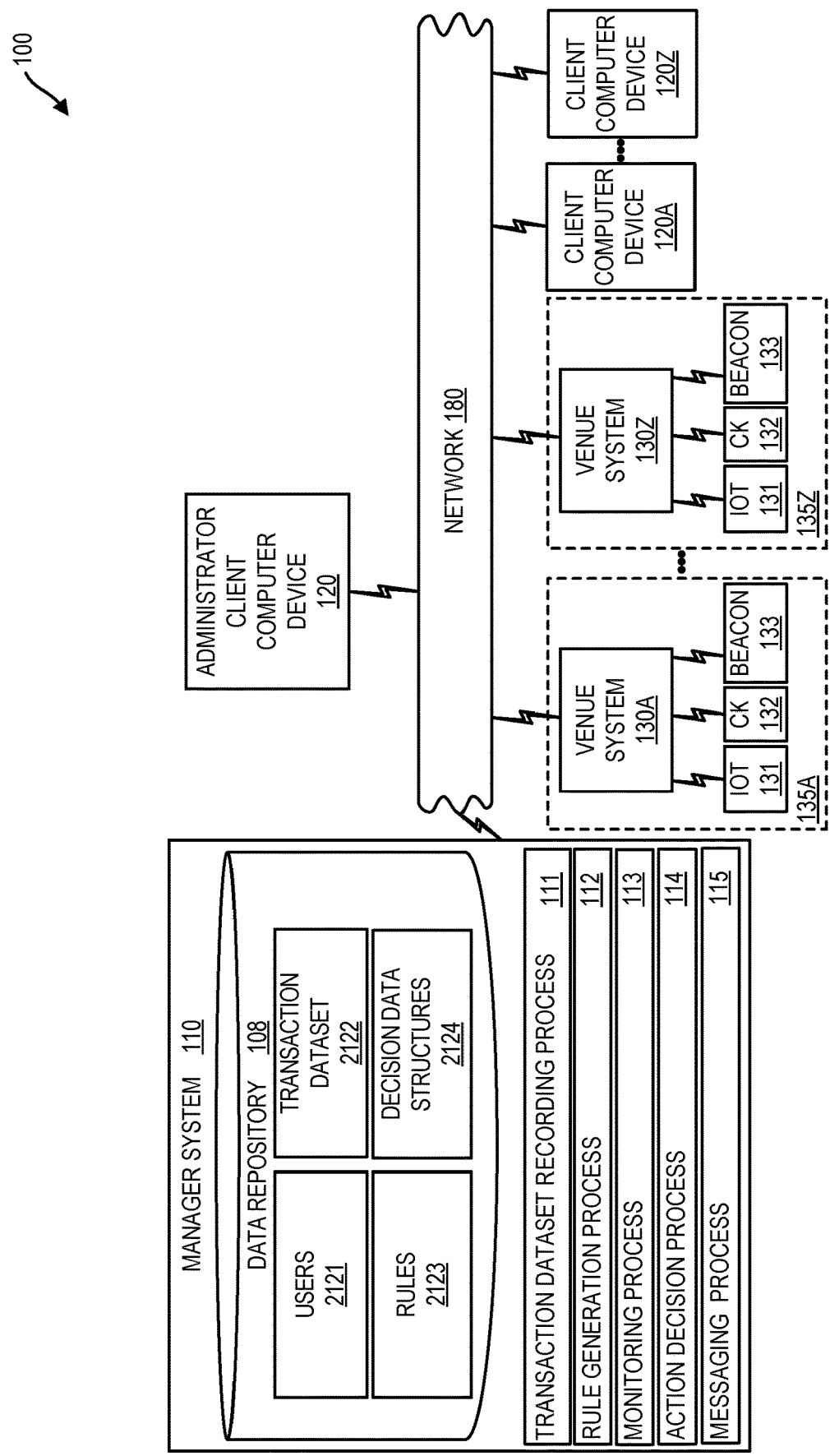
FIG. 1 depicts a system having a manager system, client computer devices, venue systems, and a administrator client computer device according to one embodiment.

System 100 for use in rule generation and for application of generated rules for driving action decisions is shown in FIG. 1. System 100 is applicable in a wide range of environments with a particular environment being highlighted for illustrative purposes in the embodiments of FIG. 1. System 100, according to the embodiment of FIG. 1, can include manager system 110 having an associated data repository 108, client computer devices 120A-120Z, and venue systems 130A-130Z. Manager system 110, client computer devices 120A-120Z, and venue systems 130A-130Z can be in communication with one another via network 180. System 100 can include numerous devices which can be computing node based devices which can be connected by network 180. Network 180 Network 180 may be a physical network and/or a virtual network. A physical network can be, for example, a physical telecommunications network connecting numerous computing nodes or systems, such as computer servers and computer clients. A virtual network can, for example, combine numerous physical networks or parts thereof into a logical virtual network. In another example, numerous virtual networks can be defined over a single physical network.

According to one embodiment, manager system 110 can be external to client computer devices 120A-120Z and venue systems 130A-130Z. According to one embodiment, manager system 110 can be collocated with one or more of client computer devices 120A-120Z and/or venue systems 130A-130Z. Each of the different client computer devices 120A-120Z can be associated to a different user. Regarding client computer devices 120A-120Z, a client computer device of client computer devices 120A-120Z can be a computing node based device provided by a client computer, e.g. a mobile device, e.g. a smartphone, tablet, laptop, smartwatch that runs one or more program, e.g. including a web browser for opening and viewing webpages defining web based displayed user interface.

Referring to FIG. 1, system 100 can include various features so that a transaction dataset of transaction dataset area 2121 stores data of article acquisition transactions. Referring to FIG. 1, each venue system of venue systems 130A-130Z can be disposed in a respective venue 135A-135Z. A respective venue of venues 135A-135Z can be a venue where articles are acquired by users, e.g. retail store according to one embodiment. At each venue the respective venue system of venue systems 130A-130Z can be in communication with an IoT sensor system 131, a checkout system 132, and a beacon system 133

Data repository 108 can store various data. Data repository 108 in transaction dataset area 2121 can store data on users of system 100. Users can include users who are associated to transactions of a transaction dataset. Users can include users who are prompted to take action by manager system 110 in response to predicted activities of the users.

Data repository 108 in transaction dataset area 2122 can store data defining transactions of a dataset. According to one embodiment, transactions can include data items that area timestamped or otherwise are time ordered so that data items defining a transaction within transaction dataset area 2122 specify a certain time order between the data items.

Data repository 108 in rules area 2123 can store rules that are generated by running of processes with respect to transaction dataset area 2121.

Data repository 108 in decision data structures area 2124 can store one or more decision data structure for use and return of action decisions, in dependence for example, on conditions associated with a premise being satisfied.

Manager system 110 can run various processes such as, transaction dataset recording process 111, rule generation process 112, monitoring process 113, action decision process 114, and messaging process 115.

Manager system 110 running transaction dataset recording process 111 can store data into data repository 108 to define a transaction dataset stored in area 2122. According to one embodiment, rules generated with use of system 100 can include rules predicting acquisition of articles. In such an embodiment, manager system 110 running transaction dataset recording process 111 can include manager system 110 receiving data from venue systems 130A-130Z having data specifying articles that have been acquired by users of system 100. According to one embodiment, system 100 can be used for the generation of rules to predict a word out of a sequence of words. In such an embodiment, manager system 110 running transaction dataset recording process 111 can include manager system 110 obtaining data of a messaging system that can be collocated with manager system 110. Received data in such an embodiment can be typed text data entered by users using user interfaces of respective client computer device 120A associated to respective users of system 100.

Manager system 110 running rule generation process 112 can include manager system 110 subjecting data of a transaction dataset to processes for generation of a time ordered sequence rule characterized by having a premise and a predicted result. For generation of a sequence rule characterized by a premise and a result, manager system 110 running rule generation process 112 can process a transaction dataset independent of timing data of the transaction dataset to return an association rule, extract data from the transaction data in dependence on the association rule, and then can use timing data associated to the extracted data to return a time ordered sequence rule having a premise and a predicted result. The premise of the sequence rule can be independent of a time order between data items defining the premise.

Manager system 110 running monitoring process 113 can include manager system 110 monitoring received data from one or more data source in an environment subsequent to deployment of a generated rule.

Manager system 110 running action decision process 114 can return action decisions in dependence on one or more condition defining a premise of a generated premise and result sequence rule being satisfied.

Manager system 110 running messaging process 115 can support messaging between users of system 100 such as users associated with respective client computer devices of client computer devices 120A-120Z who may be regarded as general users. Manager system 110 running messaging process 115 can also support messaging between manager system 110 and users of client computer devices 120A-120Z. For example, manager system 110 running messaging process 115 can autogenerate messages for transmission to users of respective client computer devices 120A-120Z and manager system 110 can auto-process received messages from users associated to client computer devices 120A-120Z. Manager system 110 running messaging process 115 can support messaging between an administrator user using administrator client computer device 125 and users of client computer devices 120A-120Z. Manager system 110 for support of messaging process 115 can incorporate a messaging system. A messaging system can be provided, e.g. by a short message system (SMS) text message delivery service. Manager system 110 can also incorporate a voice over IP (VOIP) messaging system. Thus, messaging between users of system 100 or between users of system 100 and manager system 110 (which can autogenerate messages) can be text based messages and/or voice based messages.

Embodiments herein recognize various problems and limitations with association analysis which refers by definition to analysis of events which occur "at the same time". Association analysis is directed to finding events that would frequently occur "at the same time" by associating a premise with the result. Because association analysis by definition pertains to events occurring at the same time, the analysis by definition does not take into account an order between a premise and a result. Embodiments herein recognize that sequence analysis can be used to analyze behaviors of users. By applying sequence analysis, a probability of a particular result occurring next under a premise that certain events occur in a particular order can be determined. Accordingly, sequence analysis cannot ignore the order of events in a premise. While association analysis and sequence analysis can be helpful, applying one challenge to discovering associations is that by searching massive numbers of possible associations to look for collections of items that appear to be associated, there is a risk of finding various associations that are not statistically significant, or in consuming excessive time and/or processing resources.

One challenge to both association analysis and sequence analysis is that identification of rules can consume extensive time and processing resources. Embodiments herein set forth combined approaches of association analysis with approaches of sequence analysis for the lightweight generation of useful rules which can be generated quickly and with reduced consumption of processing resources.

Embodiments can generate new and different sequence rules iteratively over time as data defining a transaction dataset accumulates in a database storing an evolving dataset. Rules generation as set forth herein using principles of association analysis and sequence analysis can evolve over time to mimic the human brain's feature extraction and association functions.

According to one embodiment as set forth herein, system 100 can be used for rules generation in the environment of item acquisition, wherein rules can be generated for prediction of an article acquisition subsequent to one or more condition associated with a premise being satisfied. A time ordered premise and result sequence rule can be generated with use of system 100.

Figure 2:
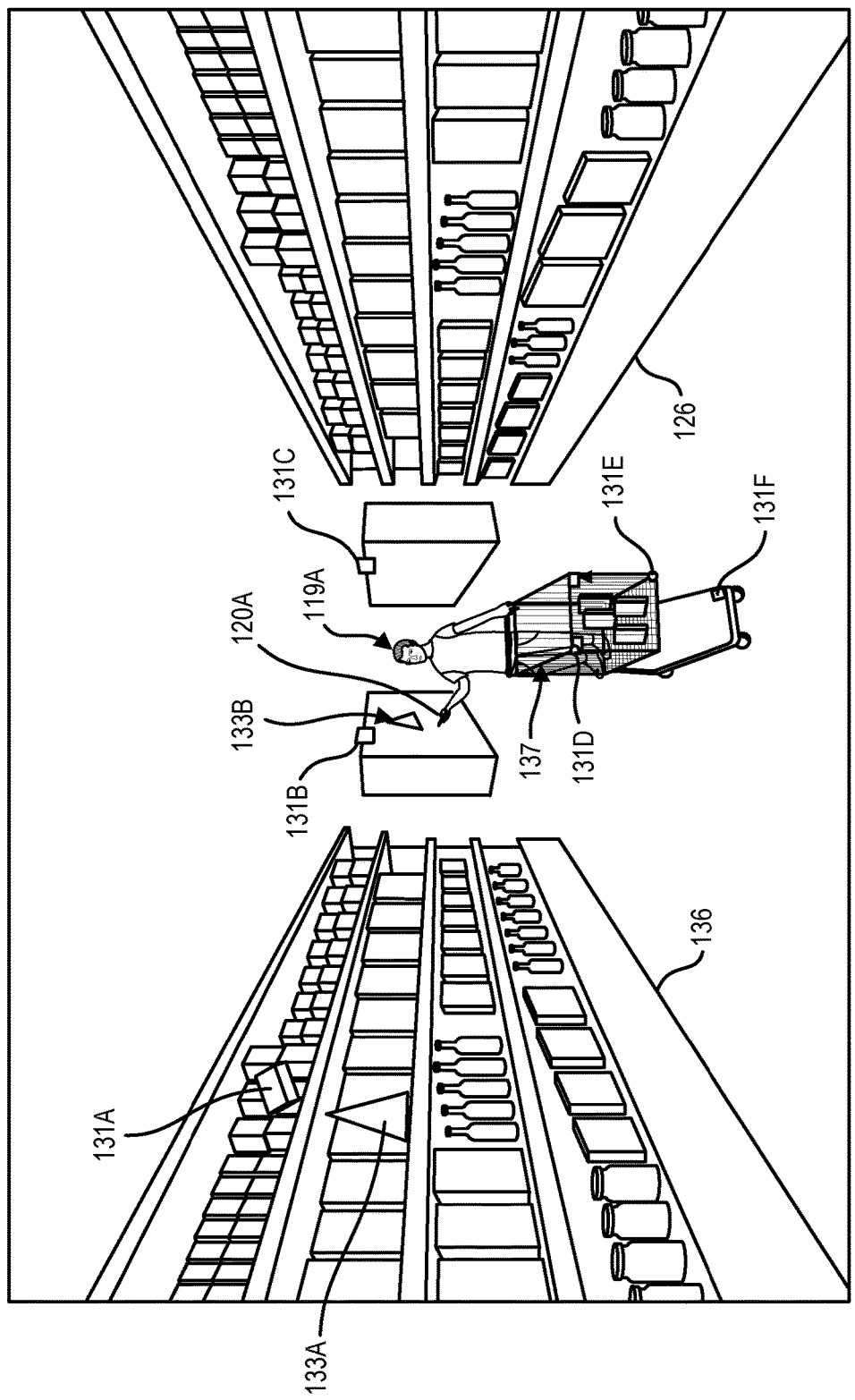
FIG. 2 is a physical form view of a venue according to one embodiment.

A physical schematic view of venue 135A is shown in FIG. 2. Referring further to venue 135A, IoT sensors of IoT sensor system 131 can also include IoT sensors 131D, 131E, and 131F mounted to shopping cart 137. IoT sensors 131D, 131E, and 131F can be for example camera based to facilitate detection of acquired articles based on image recognition.

Manager system 110 performing image recognition can examine spatial image data representing a feature of interest employing pattern recognition processing using one or more of e.g. feature extraction algorithms, classification algorithms, and/or clustering algorithms. Manager system 110 performing image recognition can include manager system 110 performing, e.g., filtering, edge detection, and/or shape classification, for facial recognition, optical character recognition (OCR), and/or encoded information (e.g. barcode) decoding.

Referring to venue 135A as shown in FIG. 2, a user 119A within venue 135A can be using a client computer device 120A associated to user 119A and within venue 135A there can be disposed a plurality of articles 136 for acquisition. User 119A can be acquiring the articles according to a time sequence. Venue 135A can have various features for use in detecting the acquisition of items according to a timed order. IoT sensor system 131 of venue 135A can include, e.g. IoT sensors 131A, 131B, and 131C that can be provided by camera sensors mounted at various locations for sensing items that are being acquired by user 119A. Manager system 110 can obtain image data provided by IoT camera sensors 131A-131C and can perform image recognition using the image data or, e.g. barcode reading to extract identifiers for various articles being acquired by user 119A. Further, article acquisition information can be determined using purchase transaction data obtainable from checkout system 132 (FIG. 1). Venue 135A can include various beacons, such as beacons 133A and 133B defining beacons system 133 of venue 135A.

Figure 3:
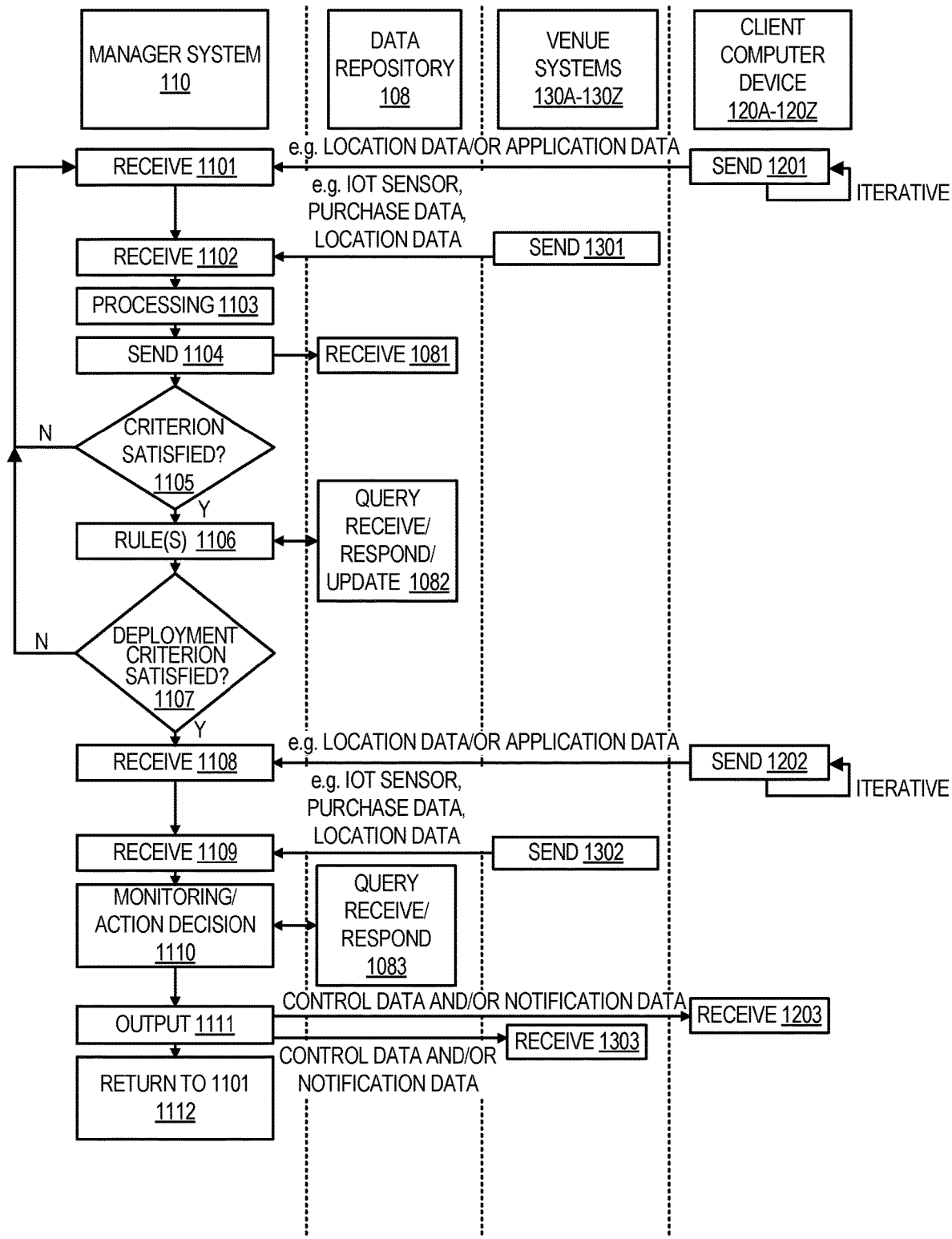
FIG. 3 is a flowchart illustrating a method for performance by a manager system interoperating with venue systems and client computer devices according to one embodiment.

FIG. 3 is a flowchart depicting a method for performance by manager system 110 interoperating with client computer devices 120A-120Z and venue systems 130A-130Z. At blocks 1101 and 1102, manager system 110 can be receiving data for use in populating data defining a transaction dataset of transaction dataset area 2121. At block 1101, manager system 110 can be receiving location data and/or application data from client computer devices 120A-120Z.

At block 1101, manager system 110 can be receiving data from client computer devices 120A-120Z throughout system 100 being sent by client computer devices 120A-120Z at block 1201. Data received at block 1101 can include, e.g. location data and/or application data from client computer devices 120A-120Z. Application data can include application data, e.g. from customer loyalty applications running on client computer devices 120A-120Z. Manager system 110 at block 1102 can be receiving data from venue systems 130A-130Z. At block 1301, venue systems 130A-130Z can be iteratively sending data for receipt by manager system 110 at block 1102. Data received by manager system 110 at block 1102 can include, e.g. IoT sensor data from IoT sensor system 131, purchase data from checkout system 132, and location data, e.g. location data specifying respective locations of users within respective venues 135A-135Z which can be determined, e.g. using WiFi based location services employing, e.g. received signal strength (RSSI), triangulation, and/or time of flight processes. IoT sensor data received at block 1102 can include, e.g. image data representing acquired articles and users. Manager system 110 on receipt of IoT sensor data can perform image recognition, e.g. to recognize articles, decode barcodes encoding identifiers for articles, and returning identifiers for users by way of performing of facial image recognition. On receipt of data at block 1101 and block 1102, manager system 110 can proceed to block 1103.

At block 1103, manager system 110 can perform processing. Processing at block 1103 by manager system 110 can include activation of transaction dataset recording process 111. Processing at block 1103 can include assembling of data items defining, e.g. a purchase transaction in which a plurality of articles are acquired according to a certain sequence. All data received at block 1101 including all location data and/or application data can be timestamped to specify the time of receipt of the real time received data. Likewise, all data received at block 1102, including all IoT sensor data, purchase data, and location data can be timestamped to specify the time of receipt of the real time received data. Processing at block 1103 can include processing to associate certain users to certain purchase transactions in which articles are acquired according to a time sequence. Associating a certain user to a purchase transaction can include a variety of processes, such as using received location data, e.g. from client computer devices 120A-120Z and/or venue system 130A-130Z specifying locations of users and matching those locations to locations of article acquisition activity, e.g. using location data specifying a location of shopping cart 137 (FIG. 2). Location data received at block 1102 can include location data specifying a location of shopping cart 137 in addition to location data specifying a location of user 119A, which user 119A can be located by performing locating of client computer device 120A. Article acquisitions can be associated to certain users further by examination of purchase transaction data received from checkout system 132, which purchase transaction data can include a list of acquired items that have been acquired and subsequently purchased, to a certain user which on completion of a purchase transaction can be identified by a transaction account identifier, such as a certain customer number. Manager system 110 on completion of processing block 1103 can proceed to block 1104.

At block 1104 manager system 110 can send processed data specifying articles acquired by their, identifiers for users associated to their acquisition and their sequence of acquisition during a purchase transaction for storage by data repository 108. Data repository 108 can store the received data at block 1081. Table A depicts data of a transaction dataset stored in transaction dataset area 2121 of data repository 108.

TABLE A

| ID | i1 | i2 | i3 | i4 | i5 | i6 | i7 | i ... | in |
|---|---|---|---|---|---|---|---|---|---|
| 001 | 0 | 0 | 0 | 0 | 1; 0901 | 0 | 1; 0922 | ... | 0 |
| 002 | 0 | 0 | 1; 0940 | 0 | 1; 0922 | 0 | 0 | ... | 1; 1023 |
| 003 | 1; 1157 | 0 | 0 | 1; 1123 | 1; 1135 | 0 | 0 | ... | 1; 1151 |
| 004 | 0 | 0 | 0 | 0 | 0 | 1; 1220 | 0 | ... | 0 |
| 005 | 1; 1232 | 1; 1231 | 0 | 0 | 1; 1301 | 0 | 0 | ... | 0 |

TABLE A-continued

| ID  | i1     | i2     | i3     | i4 | i5     | i6     | i7     | i . . . | in     |
|-----|--------|--------|--------|----|--------|--------|--------|---------|--------|
| 006 | 1; 1328| 0      | 0      | 0  | 0      | 0      | 0      | . . .   | 1; 1359|
| 007 | 0      | 1; 1330| 1; 1329| 0  | 0      | 0      | 1; 1357| . . .   | 1; 1502|
| 008 | 0      | 0      | 0      | 0  | 1; 1517| 1; 1603| 0      | . . .   | 0      |
| 009 | 0      | 0      | 0      | 0  | 1; 1637| 1; 1700| 0      | . . .   | 0      |

In the transaction dataset depicted in Table A, each row of data can include a transaction identifier that can be identified by a unique transaction ID, e.g. transaction ID 001, 002, 003, and so on. The columns of Table A specify inventory articles within a venue. There can be n classifications of articles available for acquisition with in a venue. Within each cell there can be included the binary attribute of a 1 or a 0. A 1 can indicate that the item was acquired for a purchase transaction and a 0 can indicate that the item was not acquired. For cells containing the binary value 1 to indicate that the item was acquired, the cell can also include a timestamp indicating the time of acquisition of the article within a venue, e.g. the time at which a patron user located and picked up the article within a venue and placed it within an article carrying apparatus such as a shopping cart 137. It will be understood that all timestamps indicated in Table A are inclusive of a date stamp. The transaction dataset depicted in Table A can include data specifying whether an article was acquired and the time of acquisition of each article. Thus, the transaction dataset of Table A specifies an order of acquisition of articles defining a purchase transaction. Manager system 110 on completion of block 1104 can proceed to block 1105.

Table A according to one embodiment, specifies a dataset of article acquisitions performed live within enterprise venues. It will be understood that in another embodiment, Table A can partially or entirely specify article acquisitions enterprise patron users without patron users traveling to any physical enterprise venue, e.g. can specify according to one example transactions defined by online purchase transactions of patron users wherein article acquisitions are purchased and ordered online by patron users. In the case that the dataset of Table A specifies online article purchase transactions, article acquisition times, which can be determined by examination of application data of a client computer device, can specify times that various articles have been placed in a an online virtual shopping cart as opposed to the physical shopping cart of FIG. 2.

At block 1105, manager system 110 can determine whether one or more criterion has been satisfied. The one or more criterion can be a criterion defining whether the transaction dataset, e.g. as shown in Table A is sufficient to support rules generation. Manager system 110 at block 1105 according to one embodiment, can determine whether the number of transaction rows of the transaction dataset has exceeded a defined threshold. Where manager system 110 at block 1105 determines that a current transaction dataset is insufficient to support rules generation manager system 110 can proceed to block 1101 to collect transaction data for input into the transaction dataset and the loop of 1101-1105 can continue until the one or more criterion specified at block 1105 is satisfied. When the one or more criterion specified at block 1105 is satisfied, manager system 110 can proceed to block 1106.

At block 1106, manager system 110 can generate rules. Manager system 110 performing block 1106 can include manager system 110 activating rule generation process 112 described in reference to FIG. 1. Manager system 110 performing block 1106 can include manager system 110 performing multiple iterative data queries of data repository 108. Data repository 108 at block 1082 can receive and respond to such data queries and can update data of transaction dataset area 2121 in response to certain of the data queries.

At block 1106, manager system 110 can perform processing of a transaction dataset for return of a time ordered sequence rule, wherein a predicted result is associated to a premise. Embodiments herein recognize that whereas transaction datasets can include useful information for mining of transaction datasets of significant size can consume significant resources Mining processes can result in extensive processing resources being consumed without return of any useful data. Rules extraction processes for deployment of a deployable rule can include identifying candidate rules and performing processes to evaluate such candidate rules. However, embodiments herein recognize that wherein large datasets are being evaluated, the number of candidate rules for evaluation can quickly exceed a number that can be evaluated even with use of a computer system. For example, for a transaction system using the configuration of Table A, wherein there are 10,000 articles in the dataset, e.g. n=10, 000, there can be identified over $1 \times 10^{10}$ candidate rules for evaluation. Embodiments herein recognize that for practical mining of large datasets, processes can be employed for extraction and isolation of data of interest.

Manager system 110 performing block 1106 can include manager system 110 activating rule generation process 112. Manager system 110 performing block 1106 can include manager system (a) performing an association analysis on a transaction dataset to return an association rule, wherein the association analysis is performed independent of timing data indicating a time order of data items for the respective transactions; (b) extracting transaction data defining a set of transactions of the transaction dataset using the association rule, the transaction data including timing data indicating a time order of data items for the set of transactions; (c) examining data of the transaction data using the timing data indicating the time order of data items for respective transactions of the set of transaction; and/or (d) returning a time sequence rule specifying a time ordered premise and predicted result, wherein the time sequence rule is in dependence on the examining of (c).

Manager system 110 at (a) to perform an association analysis on transaction data to return an association rule can include manager system 110 returning an association rule having a premise and a conclusion. In an article acquisition context, the conclusion can be that first one or more articles have been acquired and the premise can be that second one or more articles have been acquired. Association rules can include if-then statements that help uncover relationships between data of a dataset. An example of an association rule is the following: "if a customer has acquired article A, then the customer has also acquired article B." An association rule can include two parts, (i) an antecedent (if), and (ii) a consequent (then). An antecedent premise can include an item found in the dataset, a consequent or conclusion is an item of a dataset found in combination with the antecedent. An association rule returned at (a) can include an association rule specifying in an article acquisition context that first through Mth articles tend to be acquired together. Where M=4, the four articles herein can be referred to by the identifiers A, B, C, and D; where M=3, the three articles herein can be referred to as the articles identified by the identifiers A, B, and C; where M=2 the articles herein can be referred to as the articles identified by the identifiers A and B; and so on. The generated associated rule that first through Mth articles are acquired together can be alternatively expressed by various if-then statements, i.e. in the case of M=4, the rule that first through Mth articles tend to be acquired together can be alternatively expressed as the statement "if article A and B tend to be acquired, then articles C and D also tend to be acquired in association with A and B" or alternatively as follows "if articles A, C, and D are acquired, then article B is also acquired" and so on.

Manager system 110 can employ various filtering processes to isolate data of interest of a transaction dataset for return by association rule A. For example, manager system 110 can perform filtering of data of a transaction dataset. Manager system 110 can examine: 1) support parameter values and 2) confidence parameter values. Support herein can refer to an indication of how frequently an item set appears in a transaction dataset. Referring to the transaction dataset specified in table A, the transaction dataset of Table A can include, e.g. tens, hundreds, to thousands of columns specifying different articles for acquisition and can include, e.g. tens, hundreds, to thousands, to millions of rows specifying different transactions. Referring to manager system 110 returning a support parameter value, one itemset in reference to Table A for evaluation by manager system 110 can be the itemset specifying that articles i5 and i6 are the articles acquired together. Referring to the transaction dataset of Table A, it is seen that the rows specified with the Row ID 008 and 009 exhibit the attribute of articles i5 and i6 being acquired together. The itemset of articles i5 and i6 being acquired together have a support of 2/9=0.22 in the segment of the transaction dataset specified in Table A and would have a discernable value when data of the entire dataset of Table A is considered.

Where X is an itemset, X→Y is an association rule, and T is a set of transactions of a given transaction dataset, support of X can be regarded to be an indication of how frequently the itemset X appears in the transaction dataset. According to one example, the support of X with respect to T can be regarded to be the proportion of transactions (t) in the dataset which include the itemset X.

Regarding a confidence parameter value that can be returned by manager system 110 at A, confidence can be regarded to be an indication of how often a candidate rule for evaluation has been found to be true. The confidence value of a rule, X→Y with respect to a set of transactions (t) can be regarded to be as the proportion of transactions of X which also contain Y. Referring again to the dataset of Table A, and specifically to the segment of the dataset provided in Table A, a rule for evaluation by manager system 110 can be the rule of X=[i5,in]→Y=[i4]. Manager system 110 for return of a confidence parameter value can return the confidence parameter value of confidence=0.5 in the limited segment of the transaction database indicated in Table A given that there are two rows, namely Row 002 and Row 003, wherein X occurs and further given that in only one of the two Rows 002 and 003, does the condition Y occur. That is, the article identified by i4 is acquired in transaction Row 002 but is not in the transaction Row 003. It will be seen that confidence levels for any candidate rule for evaluation can be returned using data for an entirety of a transaction dataset.

Manager system 110 at A can perform association analysis independent of timing data of a dataset. As set forth herein with reference to Table A, the transaction dataset can include timing data, i.e. as explained herein can include timestamps associated with the acquisition of items that are acquired for each transactions, wherein the timestamp can specify a time of acquisition of an article. However, at (a) according to one embodiment, wherein manager system 110 returns an association rule the described timing data according to one embodiment is not utilized, i.e. is ignored according to one embodiment. Embodiments herein recognize that large transaction datasets can prospectively define candidate rules for evaluation that are too numerous exceed a number practically processable utilizing processing resources.

Embodiments herein for isolation of data of interest can apply association analysis to a transaction dataset having timing data without utilization of the timing data for return of reduced data of a transaction data, which reduced data can be subject to processing with use of timing data of the reduced dataset.

Manager system 110 at (a) can apply filters for return of an association rule returned at (a). The filters can be filters as described herein and can include filters that are based on one or more support parameter value exceeding a threshold and/or based on one or more confidence parameter value exceeding a threshold. The thresholds can be user defined thresholds defined, e.g. by an administrator user using administrator client computer device 125.

An administrator user interface 4000 for display on a display of administrator client computer device 125 is shown in FIG. 4. User interface 4000 can include an association rule selection area 4010, a time ordered sequence rule selection area 4020, action decision area 4030, and messaging area 4040. Time sequenced rule generation herein can include an association rule selection stage (a) wherein an association rule can be returned using an association analysis, wherein in accordance with the association analysis performed, timing data is ignored according to one embodiment.

For selection of an appropriate association rule, an administrator user using user interface 4000 can apply filters as set forth herein. Using area 4010, an administrator user can apply one or more support parameter value filter and can also apply one or more confidence parameter value filter. By adjusting settings within area 4010, an administrator user can tune system 100 so that only association rules satisfying one or more criterion, e.g. support and/or confidence criterion, are returned for use in a later processing stage in the development and return of a time ordered sequence rule.

Manager system 110 performing (b) herein can include manager system 110 extracting data defining a set of transactions from a transaction dataset using the association rule returned at (a). Manager system 110 performing extracting at (b) according to one embodiment is described with reference to Table B herein below.

TABLE B

| Order | User 1 | User 2 | User 3 | User 4 | User 5 | ... |
|---|---|---|---|---|---|---|
| 1 | Article C | *Article C* | Article A | Article A | Article A | ... |
| 2 | Article B | *Article A* | Article B | Article D | Article F | ... |
| 3 | Article A | — | Article C | Article B | Article B | ... |

TABLE B-continued

| Order | User 1 | User 2 | User 3 | User 4 | User 5 | ... |
|---|---|---|---|---|---|---|
| 4 | Article E | — | *Article D* | *Article C* | Article C | ... |
| 5 | *Article D* | — | — | Article F | *Article D* | ... |
| ... | ... | ... | ... | ... | ... | ... |

Performing the extracting at (b), manager system 110 can identify transactions of a transaction dataset in which conditions specified in an association rule are adhered to. According to one exemplary embodiment, a returned association rule returned at (a) can include the association rule that articles A, B, C, and D are associated and tend to be acquired as part of a current purchase transaction according to the described example. Extracted dataset data using the returned association rule is described with reference to Table B.

With reference to Table A and B, manager system 110 can determine that users 1, 3, 4, and 5 performed specific transactions recorded in the transaction dataset, adhering to the association rule, wherein articles A, B, C, and D are acquired together in a purchase transaction. Performing the extracting of (b), manager system 110 can utilize timing data of the original transaction dataset. In reference to Table B, it is seen that manager system 110 in performing the extracting of (b) can use timing data of the original transaction dataset to return a time order sequence of article acquisitions. Manager system 110 can determine a time sequenced order of article acquisitions by examination of the timestamp data of the original transaction dataset of Table A and for performing extracting can list acquired articles of an extracted purchase transaction in an order of their timestamps so that the extracted data defining a set of transactions from the original transaction dataset includes timing data that specifies an order of data items provided in the example described by article acquisitions. With reference to Table B, it is seen that data of user 2 mapping to a particular transaction of a transaction dataset is not utilized and not extracted by reason of user 2 failing to acquire each article specified in the association rule. The extracting performed by manager system 110 at (b) can result in a reduced set of data being returned reduced from an original transaction dataset. The reduced set of data defining extracted data can include data of transactions adhering to the association rule returned at (a) in the described example, wherein the association rule is the association rule that articles A, B, C, and D tend to be acquired together. On completion of (b) manager system 110 can proceed to (c) herein.

Referring to Table B manager system 110 can extract data of transactions satisfying the association rule of (a). The transactions mapped to user 1, 3, 4 and 5 respectively can satisfy the association rule as they include the acquisition of all articles identified by A, B, C, and D. The transaction mapped to user 2 (in italics) does satisfy the association rule. According to Table B manager system 110 can arrange article acquisitions defining each transaction in time order. According to Table B manager system 110 can identify a last article acquisition of each transaction satisfying the association rule. The last article acquisition of a transaction satisfying the association rule can be the last acquisition of an article referenced in the association rule. Manager system 110 can determine a last acquisition frequency for each article referenced in the association rule. For the transactions of User 1, 3, and 5 manager system 110 can identify the last article as article D. For the transactions of User 4 manager system 110 can identify the last article as article C. In Table B, identified last items are highlighted by an underline. In the segment of Table B shown a last article frequency of article A is 0/4=0%. A last article frequency of article B is 0/4=0%. A last article frequency of article C is 1/4=25%. A last article frequency of article D is 3/4=75%. Results can be returned taking into account the entirety of Table B.

Manager system 110 for generating a time ordered sequence rule can specify a certain article identified as having a highest last article frequency as a predicted result of a time ordered sequence rule having a premise and a predicted result. In the described example, manager system 110 can specify article D as the predicted result of a time ordered sequence rule having a premise and a predicted result. Manager system 110 can specify acquisition of the remaining articles as the premise of the sequence rule irrespective of order. On deployment of the rule, manager system 110 can monitor for acquisition of articles A, B, and C in any order. When all of articles A, B, and C have been acquired, manager system 110 can predict that article D will be subsequently acquired.

At (c) manager system 110 can perform examining data of transactions using the timing data indicating the time order of data items for transactions of a set of transactions extracted from the transaction dataset. Manager system 110 performing the examining of data at (c) can include manager system 110 examining transactions of the reduced transaction dataset indicated in Table B, and identifying the last acquired article of articles identified in an association rule. Referring to Table B for user 1, article D is the last acquired article, for user 3 article D is also the last acquired article, for the transaction of user 4 article C is the last article acquired of the articles specified in the association rule of (a), and for the transaction of user 5 article D is the last article acquired for acquired articles included in the returned association rule returned at (a). Manager system 110 can continue to identify a last acquired article for additional users having associated transactions of a reduced transaction dataset indicated by Table B. On completion of (c) manager system 110 can proceed to (d) to return a time ordered sequence rule specifying a premise and a predicted result, wherein the sequence rule is in dependence on the examining at (c).

For performing (d) according to one example, manager system 110 can establish a certain article of articles identified in an association rule as a predictive result of a sequence rule based on the certain article being identified as the article most frequently occurring as the last article acquired referenced in the returned association rule during the performing of the described examining of (c). Referring again to Table B, there can be for example 100 columns associated to 100 users and 100 transactions extracted from an original transaction dataset (Table A). Performing the examining described at (c), manager system 110 can determine that article D is the last acquired article referenced in the returned association rule for 90 of the 100 transactions, can determine that article A is the last acquired article referenced in the returned association rule for 2 of the 100 transactions, can determine that article B is the last acquired article referenced in the returned association rule for 2 of the 100 transactions, and can determine that article C is the last acquired article referenced in the returned association rule for 6 of the 100 transactions, and thus, according to (d) can select the acquisition of article D as the ensuing predicted result of a time sequence rule. For performing of (d), manager system 110 on selecting of a predicted result in the manner described, can also establish a time ordered sequence rule premise. In the described example, the time ordered sequence rule premise can be the premise that articles identified by A, B, and C are acquired. The establishing of the premise by manager system 110 can be independent of timing data associated to the acquisition of articles A, B, and C in the extracted data, e.g. as indicated by the data of transactions mapped to users 1, 3, 4, and 5 in Table B. A returned time ordered sequence rule according to the described example can be returned as follows: where articles identified by A, B, and C are acquired article D will be the next article acquired by the user. The rule can be more broadly stated as: where articles A, B, and C are acquired a subsequent article D will be subsequently acquired. A higher probability can be assigned to the alternate and broader statement of the rule. There is set forth herein a method for dataset analysis that does not take account of the order of events in a premise but takes account of a time order between premise and a predicted result.

Manager system 110 performing (d) can be assigned likelihoods (probabilities) to predicted results returned with a sequence rule in dependence on frequencies associated to an identified last acquired article out of articles referenced in an association rule of (a). In the described example described with reference to Table B, article D was determined to be the last acquired article of examined transactions with a frequency of 90%. According to another example, the frequency associated to an article identified as the last acquired article can have a last acquisition frequency of, e.g. 40%, 52%, 61%, and so on.

Manager system 110 at (d) can assign probabilities to returned predicted results of a returned time sequence rule in dependence on a value of a last acquisition frequency of the article having the highest associated last acquisition frequency out of articles referenced in the association rule of (a) and referenced in a predicted result of a returned time ordered sequence rule. Manager system 110 can assign a higher likelihood that an article specified in a predicted result of a time ordered sequence rule will be subsequently acquired where a determined last acquisition frequency associated to the article is higher and can assign the relatively lower likelihood to a predicted result, where a value of last acquisition frequency associated to the article is determined to be lower. Assigned likelihoods can in addition depend on other factors, e.g. on a previously determined confidence associated to an extracted dataset as described in connection with returned confidence parameter values as set forth herein.

Returning to the flowchart of FIG. 3, manager system 110 on completion of block 1106 can proceed to block 1107. At block 1107, manager system 110 can determine whether a deployment criterion for deploying a returned time sequence rule can be deployed. According to one example, a criterion examined at block 1107 can be the criterion of whether a likelihood assigned and associated to a result of a returned sequence rule exceeds a threshold. The threshold can be, for example, a user defined threshold defined by an administrator user using administrator user interface 4000. For example, referring to user interface 4000 displayed on a display of administrator client computer device 125, an administrator user can use area 4020 to set a threshold associated to the returned time ordered sequence rule having a premise and an associated predicted result.

Using area 4020, a user can tune system 100 so that only time sequenced rules satisfying a selected one or more criterion are qualified for deployment. Where manager system 110 at block 1107 determines that one or more deployment criterion are not satisfied, manager system 110 can return block 1101 and can iteratively perform block 1101-1107 until a time sequence rule satisfying one or more criterion examined at block 1107 is satisfied. Where manager system 110 determines at block 1107 that one or more criterion for deployment of a time sequence rule is satisfied, manager system 110 can proceed to block 1108. As indicated by the flowchart of FIG. 3, even where the "Yes" condition associated to block 107 is satisfied, manager system 110 can while branching to block 1108 simultaneously return to block 1101 to continue to populate data items of the transaction dataset area 2121 and can continue to generate rules evaluated for deployment iteratively while performing blocks 1108-1112.

The examining at (c) once an article having a highest frequency of last acquisition out of articles referenced in an association rule of (a) is determined (article D in the described example) can be independent of timing data specified for remaining articles e.g. articles A, B, C in the described example. The examination of timing data can be restricted to the examination of timing data to determine for extracted data defining respective transactions the last article acquired out of a set of articles specified in a returned association rule of (a) and identifying an article having a highest frequency of last acquisition out of articles references in an association rule of (a). Thereafter, timing data specifying an order of acquisition of remaining articles referenced in an association rule of (a) need not be utilized. At (e) the ordering of the acquisitions of articles A, B, C need not be examined subsequent to the identification of the article identified by D having the highest frequency of last acquisition out of articles references in an association rule of (a).

Figure 6:
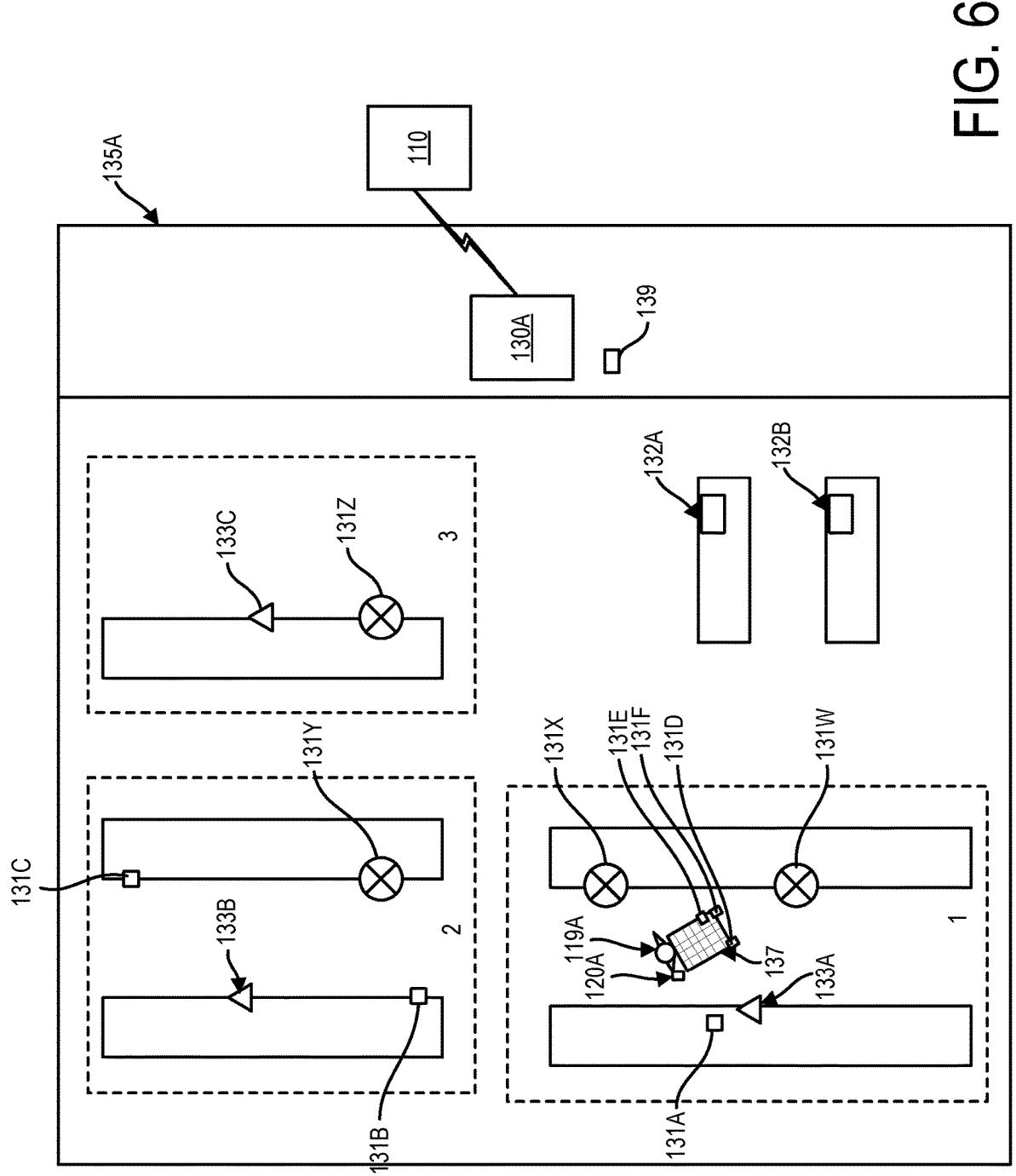
FIG. 6 depicts a schematic top view of the venue shown in FIG. 2 incorporating the venue system that is in communication with a manager system according to one embodiment.

Manager system 110 at block 1108 can be receiving data from a certain client computer device, e.g. client computer device 120A associated to a certain user, e.g. 119A depicted in FIG. 2. At block 1109, manager system 110 can be receiving data from venue system 130A associated to venue 135A. An overhead schematic view of venue 135 depicted in FIG. 2 is depicted in FIG. 6. Data received at block 1109 can be sent by client computer device 120A at block 1202 and data received by manager system 110 at block 1109 can be sent by venue system 130A at block 1302. Data received at block 1108 can include, e.g. location data of client computer device 120A, e.g. as may be provided by a GPS system and/or can include application data such as application data from a customer loyalty application running on client computer device 120A. Client computer device 120A can run a customer loyalty application that is associated to an enterprise that operates venue 135A. When downloading such a customer loyalty application, user 119A may have granted permission to receive various data of user 119A stored on client computer device 120A including data of the downloaded customer loyalty application. System 100 can be configured so that user 119A can opt out of any permission and grant it at any time.

Data received at block 1108 can be received, e.g. through a cellular service system. A downloaded customer loyalty application running on client computer device 120A can configure client computer device 120A to receive message data, e.g. defining notification data from manager system 110. Manager system 110 can send notification data to client computer device 120A, e.g. through a cellular service network and/or through beacons defining beacon system 133 as explained with reference to FIG. 1. Manager system 110 receiving data at block 1109 can include manager system 110 receiving, e.g. IoT sensor data from IoT system 131, purchase data, e.g. received through checkout system 132, and beacon data, e.g. as received from beacon system 133.

IoT sensor data can include, e.g. spatial image data captured with use of camera based IoT sensors such as sensors such as IoT camera sensors 131A, 131B, 131C distributed throughout venue 135A as well as IoT sensors 131D, 131E, and 131F disposed on shopping cart 137. Location data received at block 1109 can include location data specifying a location of client computer device 120A and therefore specifying a location of user 119A.

Location data received at block 1109 can include, e.g. WiFi based location data that utilizes, e.g. one or more of RSSI, triangulation, and/or time of flight processes. Location data received at block 1109 can also include location data, e.g. WiFi based location data that specifies a location within venue 135 of shopping cart 137. For example, one or more of IoT sensors 131D, 131E, and/or 131F can include an associated radio transceiver that facilitates the locating of shopping cart 137 using, e.g. WiFi based locating services that employ, e.g. RSSI, triangulation, and/or time of flight processes. Manager system 110 at block 1110 can perform monitoring of received data received at block 1108 and block 1109.

Manager system 110 at block 1110 can perform processing of data received at blocks 1108 and 1109 to determine articles placed in shopping cart 137 and an identifier for user 119A using shopping cart 137. Data received at blocks 1108 and 1109 can be timestamped to indicate the time of output of data received at blocks 1108 and 1109. Processing for identification of articles disposed in shopping cart 137 at block 1110 can include, e.g. image recognition processing to recognize articles by shape and can also include, e.g. OCR processing to read labels on articles and encoded information decoding such as barcode decoding to return identifiers for articles. Manager system 110 at block 1110 can timestamp identified articles with timestamps indicating a timing of their acquisition, e.g. based on frames of image data representing an initial time of disposal of an article within shopping cart 137. Manager system 110 at block 1110 can match a determined location of shopping cart 137 to a determined location of user 119B. Based on a determination that a location of shopping cart 137 matches a determined location of user 119B manager system 110 can determine that the user 119B commonly located with shopping cart 137 is the user performing the acquiring of articles. For determining a location of user 119A, manager system 110 can determine a location of client computer device 120A being used by a user 119A. Manager system 110 determining that user 119A is acquiring the articles within shopping cart 137 can include manager system 110 determining that client computer device 120A of user 119A has remained at a common location with shopping cart 137 for more than a threshold period of time.

Manager system 110 performing monitoring at block 1110 can include manager system 110 performing monitoring to determine whether user 119A has satisfied the condition specified in a premise of the returned time sequence rule returned at (d). In the described example, manager system 110 at block 1110 can determine that a user has acquired articles identified by article identifiers A, B, and C (in any order) and based on user 119A having acquired articles A, B, and C (in any order) can return the prediction that user 119A will acquire the article identified by article identifier D. Manager system 110 can predict according to the returned time ordered sequence rule that user 119A will acquire article D based on the premise condition being satisfied that article A, B, and C have been acquired. Manager system 110 at block 1110 based on the noted prediction can return an action decision. According to one embodiment, an action decision can be returned using a decision data structure such as the decision data structure described in Table C.

TABLE C

| Row | Likelihood | Action Decision |
|---|---|---|
| 1 | 0.2 < p ≤ 0.6 | Action set A (e.g. notification to user specifying location within venue of article) |
| 2 | 0.6 < p ≤ 0.7 | Action set B (e.g. actions of Row 1 plus radio control and notification to administrator user) |
| 3 | p > 0.7 | Action set C (e.g. action decisions of Rows 1 and 2 plus deployment of in-venue mechanical robot) |
| ... | ... | ... |

Referring to Table C, different action decisions can be fired in dependence on a likelihood assigned to a specified predicted result associated to a returned time ordered sequence rule returned at (d) herein. As described herein, a likelihood associated with a returned time sequence rule can be assigned in dependence on a value of a last acquisition frequency of the article having the highest associated last acquisition frequency out of articles referenced in the association rule of (a) and referenced in a predicted result of a returned time ordered sequence rule.

Referring to Table C, where a predicted likelihood associated with a sequence rule is <0.2 but ≥0.6 Row 1 can be fired. Where an assigned likelihood of the predicted result is <0.6 but ≥0.7 Row 2 can be fired. Where the assigned likelihood of the predicted result is <0.7 Row 3 can be fired. The action decision associated with Row 1 can specify one or more action defining action set A, the action decision associated with Row 2 can specify one or more action defining action set B, the action decision associated with Row 3 can specify one or more action defining action set C. Action set A can include for example the action to send a notification to user 119A specifying a location within the venue 135A of article D and action set B can include all of the actions of Row 1 plus the additional action of one or more radio signal control action and a notification to an administrator user. In response to the prediction that user 119A will acquire article D, the decision data structure of Table C can trigger various action decisions as are specified in Table C.

Referring to FIG. 6, depicting a top view spatial diagram of venue 135A, venue 135A can include beacon system 133 having beacons 133A, 133B, and 133C distributed into respective zones I, II, and III. According to one embodiment, the article predicted for subsequent acquisition by user 119A can be located in zone II associated to beacon 133B. Beacons 133A-133C defining a beacon system 133 can be used to send in-venue notifications to user 119A through client computer device 120A. Beacons 133A-133C can employ short range radio communications so that client computer device 120A can selectively receive notifications by certain ones of beacons 133A-133C when client computer device 120A is within a threshold communication range of a respective beacon 133A, 133B, and 133C. According to an action decision that can be returned at Row 3, an action decision can be specified to increase radio signal strength transmitted by a beacon at the zone at which the predicted acquired article is located so that the user is more likely to receive a beacon transmitted message. In the described example, article D which is the predicted article, can be located at zone II whereas user 119A is located at zone I. In such an embodiment, an action decision that can be fired in accordance with Row 2 can be an action decision to increase the radio signal strength of radio signals transmitted by beacons 133B and can be received by client computer device 120A associated with user 119A. Venue 135A can include a deployed robot 139 and checkout computing nodes, e.g. including cash registers and/or card readers defining checkout system 132.

In accordance with another radio signal control action decision, previously inactive beacons can be activated to transmit radio signals for reception by client computer device 120A. For example, according to a radio control action decision that can be activated as part of an action decision, e.g. associated to Row 2, auxiliary beacons 133W, 133X, 133Y, and 133Z which are normally inactive can be activated and notifications can be transmitted through the newly activated beacons for reception by client computer device 120A. The auxiliary beacons can be distributed at additional locations through venue 135A to increase the likelihood of beacon communication with client computer device 120A associated to user 119A.

According to another radio signal control action decision, an action decision can be specified to control a radio transceiver of client computer device 120A, e.g. to increase a sampling rate of a radio transceiver of client computer device 120A, e.g. on a short term basis to increase the likelihood that client computer device 120A associated to user 119A can receive a beacon transmitted notification transmitted from a beacon 133B in a zone having the article, i.e. article D in the described example, predicted for acquisition.

According to another radio signal control action decision, a radio signal control action decision can be returned to activate previously inactive locating services. For example, beacons 133A-133C and auxiliary beacons 133W-133Z can, according to a baseline configuration of venue 135A, not be utilized to provide locating services for locating client computer device 120A associated to user 119A, where the locating service provides a coordinate location of client computer device 120A. For example, the described beacons can according to a baseline configuration of venue 135A can return location data specifying a location of client computer device 120A and therefore user 119A but only on a coarse basis. For example, according to a coarse locating service normally provided by beacon system 133 (FIG. 1) the radio communication between a beacon and client computer device 120A can return the coarse location data specifying that client computer device 120A is associated to a certain zone having a certain beacon, but according to the baseline configuration does not return coordinate data specifying a coordinate location of client computer device 120A. In accordance with a radio control action decision that can be associated to Row 2 of Table C beacons defining beacon system 133 can be activated to perform coordinate locating of client computer device 120A based on received beacon radio signals received from client computer device 120A from various beacons employing, e.g. received signal strength, RSSI, triangulation, and/or time of flight processes. Thus, one radio control action decision can be the action decision to activate locating service to return location data specifying a location of client computer device 120A and user 119A at higher resolution, e.g. with coordinate location where according to a baseline configuration location data can be provided on a zone association basis without coordinate location data.

Further in accordance with the action decision specified for Row 2, an action decision can include an action decision to send a notification to administrator user associated to administrator client computer device 125. Such notification which can be displayed in messaging area 4040 of user interface 4000 of FIG. 4 can notify an administrator user who can be, e.g. an in-venue agent of an enterprise, that a user who is predicted to acquire article D is at a particular location within venue 135A. According to one embodiment, the notification in accordance with the described action decision to administrator user can specify to the administrator user a determined coordinate location of the user which coordinate location data may have been returned by the described action decision to activate within venue 135A additional locating services, enhanced locating services to return coordinate location data specifying a location of client computer device 120A associated to user 119A. According to one embodiment an instance of administrator client computer device 125 amongst a plurality of instances of administrator client computer device 125 can be a mobile client computer device used by an in-venue administrator user who can view the notification (which notification can be presented in text based form on a display screen of client computer device 125 which can be provided by a mobile client computer device) while travelling within the venue to the location of user 119A.

Referring further to Table C and Row 3, the action decision associated with Row 3 can include all of the actions specified for Rows 1 and 2 plus the additional action of deploying an in-venue mechanical robot to deliver the article predicted for acquisition to the user 119A.

Referring to FIG. 6, venue system 130A can be in communication with an autonomous mechanical robot 139 capable of, e.g. picking up articles from venue locations and delivering them to different locations within venue 135A. An action decision associated to Row 3 can be the action decision, wherein robot 139 autonomously travels to the location within zone II to pick up a described article identified by article identifier D, and can then deliver the article by travelling within the venue to the coordinate location of user 119A who is at the location of client computer device 120A associated to user 119A. On completion of block 1110, manager system 110 can proceed to block 1111. Regarding Row 3 in the case the dataset comprises data of online article acquisitions, the action decision to dispatch a robot within a venue can be replaced with an action decision to dispatch an autonomous vehicle to transport the predicted acquired article to a location e.g. home residence of a certain user predicted to acquire an article based on having acquired articles specified in a premise.

At block 1111, manager system 110 can provide one or more output for performance of the action decision returned at block 1110. Manager system 110 at output block 1111 can, e.g. send control data and/or notification data for receipt by venue system 130A at block 1303. Manager system 110 at block 1111 can in addition or alternatively send control and/or notification data for receipt by client computer device 120A at block 1203. In response to receipt of control data, venue system 130A at block 1303 can respond to perform the action of the action decision mapped to the control data. For example, venue system 130A at block 1203 can respond to control data in a manner to perform one or more of the radio control actions described herein, e.g. increasing signal strength of radio signals transmitted by beacon 133B, activating auxiliary beacons 133W-133Z, and/or activating higher resolution, e.g. coordinate based locating services provided by beacon system 133 defined by beacons such as beacons 133A-133C and auxiliary beacons 133W-133Z. Notification data received at block 1303 can be responded to by the display of such notification data. The notification data can include, e.g. text based notification data.

Referring to FIG. 4 displayed user interface 4000 displayed on administrator client computer device can display notification data in messaging area 4040 of user interface 4000. Control data received by client computer device 120A at block 1203 can include control data described in reference to the decision data structure of Table C and can include such control data as control data responded to by client computer device 120A on receipt thereof by increasing a sampling rate of a radio transceiver of client computer device 120A so that client computer device 120A is more likely to receive a beacon transmitted notification transmitted by a beacon, e.g. beacon 133B located in a zone II in the described example having article D predicted for acquisition. Notification data received at block 1203 can be responded to by client computer device 120A displaying the notification data. The notification data can be, e.g. text based data which can be displayed in messaging area 5040 of displayed user interface 5000 which can be displayed on a display of client computer device 120A (FIG. 5). In response to receipt of notification data at block 1203, administrator client computer device 125 in addition to displaying text based data defining the notification data can present a synthesized voice presentment of the received notification data. Likewise, in addition to presenting a text based presentment of received notification data received at block 1203, client computer device 120A can present a synthesized voice presentment of the received notification data. Manager system 110 on completion of block 1111 can proceed to block 1112.

At block 1112, manager system 110 can return to block 1101 to continue to receive data for accumulation into a transaction dataset stored in transaction dataset area 2121 of data repository 108. As set forth herein, data repository 108 in transaction dataset area 2121 can store more than one transaction dataset and the more than one transaction dataset can include various data other than article purchase acquisition transaction data. Likewise, transaction dataset recording process 111, rule generation process 112, and monitoring process 113 can act on data other than article related data. According to one embodiment, manager system 110 running transaction dataset recording process 111 can include manager system 110 storing into transaction dataset area 2121 a transaction dataset of transactions, wherein the transactions area messages, e.g. text based messages or voice based messages that can be converted into text, wherein the messages are initiated by users of respective client computer devices 120A-120Z. For messages received by messaging process 114 from client computer devices 120A-120Z from various users of client computer devices 120A-120Z, messaging process 115 can activate a natural language processing (NLP) process to break down received messages into sentences. Manager system 110 can then store data of segmented sentences into transaction dataset area 2121 as a transaction dataset. Such a transaction dataset of sentences can have the form, generally as described in connection with Table A.

Referring to Table A according to the example where transactions are segmented sentences of messages, each segmented sentence can be stored in a transaction dataset as shown in Table A as a transaction having a transaction identifier, e.g. 001-009. The column headings i1-in instead of referring to articles can refer to words of a dictionary, e.g. a limited dictionary having a limited number of commonly used word, e.g. 5,000 words according to one example. A 0 in a cell of a transaction dataset can indicate that the word is not used in a sentence, whereas a 1 in a cell can indicate that the word was used in a sentence. In the described example of a transaction dataset where transactions map to sentences, the different words can also include differentiated timestamps which can be closely spaced in time, e.g. on a microsecond level and can indicate the order in which the words of a sentence were initially received by messaging process 115 or alternatively, originally typed or spoken by a user.

With the transaction dataset established as described, the established transaction dataset for transactions mapping to sentences can be subject to the same processing described in reference to block 1106. Processing can include (a) performing an association analysis on a transaction dataset to return an association rule, wherein the association analysis is performed independent of timing data indicating a time order of data items for the respective transactions; (b) extracting transaction data defining a set of transactions of the transaction dataset using the association rule, the transaction data including timing data indicating a time order of data items for the set of transactions; (c) examining data of the transaction data using the timing data indicating the time order of data items for respective transactions of the set of transaction; and/or (d) returning a time sequence rule specifying a time ordered premise and predicted result, wherein the time sequence rule is in dependence on the examining of (c).

In a sentence transaction version of Table A and Table B, articles mapped to various users of various transactions can be mapped instead to sentence words. Manager system 110 instead of identifying a last article acquired by each user associated to a certain transaction, instead identifies a last word specified in a returned association rule returned at (a) for each sentence defining a transaction. Manager system 110 can establish a certain word as a predicted result of a sequence rule based on that word being most frequently determined to be the last word of each transaction subject to examining specified in a return association rule at (a). Manager system 110 can assign a likelihood to return predicted results in the manner described in reference to Table B.

The returned time sequence rule can be deployed by manager system 110 for predictive text control active when users of client computer devices 120A-120Z use their respective client computer devices for sending of text based messages. Decision data structure for predictive text processing is described in Table D.

TABLE D

| Row | Likelihood | Action Decision |
| --- | --- | --- |
| 1 | $0.2 < p \leq 0.7$ | Present prediction word for selection |
| 2 | $P > 0.7$ | Automatically add word |
| ... | ... | ... |

The assigned likelihood can be in dependence on a result of the frequency count. The action decision of Row 1 can be the action decision with lower assigned likelihood that the predicted word will be typed next and can have the action decision of presenting the predicted word for selection by a user. Row 2 of Table D specifies action decisions that can be returned when there is assigned a higher likelihood to a predicted subsequent word of a sentence. The action decision associated with Row 2 can be the action decision to automatically add the word predicted to occur next in a sentence.

FIG. 5 illustrated a user interface 500 that can be displayed on a display of client computer devices 120A-120C such as may be used by first and second users who conversing with one another via text based messages or voice based messages converted to text. Referring to FIG. 5, text box 5012 illustrates Row 1 of Table D being fired. In the case that a predicted result is that word D is a next word in a sentence being typed and a premise associated with a returned sequence rule is that words A, B, and C are used in a sentence irrespective of order. Referring to text box 5012, a user can be typing into text box 5012 a sentence including word C and then subsequently word B and subsequently word A, whereupon the sequence rule predicted result can be triggered to return the prediction that word D is the next word that will be typed. Based on the lower likelihood associated to Row 1, the action decision can be an action decision to present the predicted word D in area 5013 adjacent to text box 5012 to permit the user to select word D. On the selection of word D in the highlighted area 5013, word D can be added to the text sentence being authored using text box 5012.

Referring to text box 5014, text box 5014 refers to Row 2 of Table D being fired having a higher likelihood assigned to the prediction that word D will be typed as a next word on the typing of word A, B, and C in a common sentence. Referring to text box 5014 a user can type word B, then word A, and then word C in a sentence whereupon the premise conditions are satisfied and manager system 110 in accordance with the sequence rule predicts that word B will be a next word type. Because of the higher likelihood associated to Row 2 and in accordance with the action decision specified in Row 2, word D can be automatically populated into text box 5014 and user 119A can delete word D if the prediction was not accurate.

Embodiments herein recognize that association analysis is directed to finding events that frequently occur "at the same time" by associating a premise with a consequence. For this reason, the analysis does not take account of the order between the premise and the result.

Embodiments herein recognize that sequence analysis takes into account the order into account. Sequence analysis can be used to analyze behaviors of users. Sequence analysis can find the probability of a particular result occurring next under a premise that certain events occur in a particular order. Embodiments herein recognize that for this reason, sequence analysis cannot ignore the order of the events in the premise.

There is set forth herein a method for dataset analysis that does not take account of the order of events in a premise but takes account of a time order between premise and a result.

Stages can include (i) carrying out association analysis; (ii) extracting that that matches the association rule; (iii) defining a result; and (iv) generating a sequence rule that ignores a sequence of events defining a premise but takes into account an order between the premise and a result.

Stage (i) can be carried out using association analysis against sequence data including order information, with the order information being ignored, to generate an association rule. An example of generated rule can be: A user who has purchased articles A, C and D tends to have purchased article B together with those articles.

Stage (ii) can include extracting data that match the association rule obtained by the analysis. Example of extracted data: Users 1, 3, 4 and 5 each have purchased articles A, B, C and D together. See Table B.

Stage (iii) can include identifying the order of extracted data and last items of extracted sets of data. The last item can be a least item referenced in the association rule.

Items indicated by red characters are ones included in the rule generated by the association analysis.

Items having a yellow background are ones defined as results in the present step.

Stage (iv) can include generating an association rule taking account of the order between a premise and the result on the basis of which article has the highest last acquisition frequency.

Referring to Table B manager system 110 can extract data of transactions satisfying the association rule of (i). The transactions mapped to user 1, 3, 4 and 5 respectively can satisfy the association rule as they include the acquisition of all articles identified by A, B, C, and D. The transaction mapped to user 2 (in italics) does satisfy the association rule. According to Table B manager system 110 can arrange article acquisitions defining each transaction in time order. According to Table B manager system 110 can identify a last article acquisition of each transaction satisfying the association rule. The last article acquisition of a transaction satisfying the association rule can be the last acquisition of an article referenced in the association rule. Manager system 110 can determine a last acquisition frequency for each article referenced in the association rule. For the transactions of User 1, 3, and 5 manager system 110 can identify the last article as article D. For the transactions of User 4 manager system 110 can identify the last article as article C. In Table B, identified last items are highlighted by an underline. In the segment of Table B shown last article frequency of article A is 0/4=0%. A last article frequency of article B is 0/4=0%. A last article frequency of article C is 1/4=25%. A last article frequency of article D is 3/4=75%. Results can be returned taking into account an entirety of Table B.

Accordingly, an example of generated rule can be: A user having purchased articles A, B and C has a strong tendency to purchase article D subsequently.

Manager system 110 for generating a time ordered sequence rule can specify a certain article identified as having a highest last article frequency as a predicted result of a time ordered sequence rule having a premise and a predicted result. In the described example, manager system 110 can specify article D as the predicted result of a time ordered sequence rule having a premise and a predicted result. Manager system 110 can specify acquisition of the remaining articles as the premise of the sequence rule irrespective of order. On deployment of the rule, manager system 110 can monitor for acquisition of articles A, B, and C in any order. When all of articles A, B, and C have been acquired, manager system 110 can predict that article D will be subsequently acquired.

Embodiments herein recognize that ignoring an order of events in a premise makes it possible to predict a article to be purchased subsequently by a user having acquired certain articles, "irrespective of the order of purchasing the articles". Predictions returned can be used to trigger action decisions e.g. action decisions to prompt users to perform an activity such as acquire an article.

Certain embodiments herein may offer various technical computing advantages involving computing advantages to address problems arising in the realm of computer networks and computer systems. Embodiments herein can address a big data problem, wherein a dataset can become so large that while the dataset potentially includes useful information evaluations of data of the dataset can consume extensive computing resources without return of any useful information. Embodiments herein can include use of a dataset having timing data indicating an order of data items of a transaction. However, the timing data for efficient and intelligent data mining need not be utilized for specified processing stages. Embodiments herein can provide efficient utilization of a large dataset, wherein computing resource conserving processing can include performing an association analysis. The method can include, for example: performing an association analysis on a transaction dataset to return an association rule, wherein the association analysis is performed independent of timing data indicating the time order of data items for the respective transactions; extracting data defining a set of transactions from the transaction dataset using the association rule; examining the data defining a set of transactions using the timing data indicating the time order of data items for transactions of the set of transaction; returning a sequence rule specifying a time sequenced premise and predicted result, wherein the sequence rule is in dependence on the examining; monitoring activities of a user for occurrence of a condition defining the premise of the sequence rule; and returning an action decision in response an occurrence of the condition. Embodiments herein can include processes for intelligent filtering of data for the providing of reduced datasets that can be intelligently mined for rules extraction while consuming reduced resources. Embodiments herein can generate new and different sequence rules iteratively over time as data accumulates in a database storing an evolving dataset. Rules generation as set forth herein using principles of association analysis and sequence analysis can evolve over time to mimic the human brain's feature extraction and association functions. Embodiments herein can include use of decision data structures such as action decisions that are returned when a condition associated to a premise of a sequence rule are satisfied. Action decisions according to one embodiment can be mapped to a likelihood data value assigned to a predicted result of a returned sequence rule. Action decisions when returned can result in various data transmissions such as data transmissions involving control data and/or notification data. Control data can include, e.g. control data effecting radio signal transmissions according to one example. Certain embodiments herein may offer various technical computing advantages involving computing advantages to address problems arising in the realm of, computer networks operating to provide location based services (LBS). A fundamental aspect of operation of a computer system is its interoperation to which it operates including human actors. By increasing the accuracy and reliability of information presented to human users, embodiments herein increase the level of engagement of human users for enhanced computer system operation. Various decision data structures can be used to drive artificial intelligence (AI) decision making, such as a decision data structure that cognitively maps differentiated likelihoods associated to a prediction with differentiated action decisions. Decision data structures as set forth herein can be updated by machine learning so that accuracy and reliability is iteratively improved over time without resource consuming rules intensive processing. Machine learning processes can be performed for increased accuracy and for reduction of reliance on rules based criteria and thus reduced computational overhead. For enhancement of computational accuracies, embodiments can feature computational platforms existing only in the realm of computer networks such as artificial intelligence platforms, and machine learning platforms. Embodiments herein can employ data structuring processes, e.g. processing for transforming unstructured data into a form optimized for computerized processing. Embodiments herein can examine data from diverse data sources such as data sources that process radio signals for location determination of users. Embodiments herein can include artificial intelligence processing platforms featuring improved processes to transform unstructured data into structured form permitting computer based analytics and decision making. Embodiments herein can include particular arrangements for both collecting rich data into a data repository and additional particular arrangements for updating such data and for use of that data to drive artificial intelligence decision making. Certain embodiments may be implemented by use of a cloud platform/data center in various types including a Software-as-a-Service (SaaS), Platform-as-a-Service (PaaS), Database-as-a-Service (DBaaS), and combinations thereof based on types of subscription.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer implemented method including: performing an association analysis on a transaction dataset to return an association rule, where the transaction dataset specifies data of a plurality of transactions, where respective transactions of the plurality of transactions include timing data indicating a time order of data items, where the association analysis is performed independent of the timing data indicating the time order of data items for the respective transactions of the plurality of transactions; extracting transaction data defining a set of transactions of the transaction dataset using the association rule, the transaction data including timing data indicating a time order of data items for respective transactions the set of transactions; examining data of the transaction data to identify for respective transactions of the set of transactions a certain data item of data items defining the respective transaction of the set of transactions, where the examining includes using the timing data indicating the time order of data items for respective transactions of the set of transactions; returning a time ordered sequence rule specifying a time ordered premise and predicted result, where the time ordered sequence rule is in dependence on the examining; monitoring activities of a user for occurrence of a condition defining the premise of the sequence rule; and returning an action decision in response an occurrence of the condition. Other embodiments of this aspect include corresponding computer systems, apparatus, and computer programs recorded on one or more computer storage devices, each configured to perform the actions of the methods.

Implementations may include one or more of the following features. The computer implemented method where the timing data indicating a time order of data items for the respective transactions of the set of transactions includes timing data indicating a time order of acquisition of articles. The computer implemented method where the timing data indicating a time order of data items for the respective transactions of the set of transactions includes timing data indicating a time order of acquisition of articles by patron users of an enterprise that provides articles, where the action decision is an action decision to prompt a user to acquire an article of a certain classification located within a venue of the enterprise. The computer implemented method where the timing data indicating a time order of data items for the respective transactions of the set of transactions includes timing data indicating a time order of acquisition of articles by patron users of articles provided by an enterprise, where the predicted result is that a certain article will be acquired, where the action decision is an action decision to dispatch an autonomous article carrying apparatus to transport the article to a determined location of a certain user predicted to acquire the certain article. The computer implemented method where the timing data indicating a time order of data items for the respective transactions of the set of transactions includes timing data indicating a time order of acquisition of articles, where the association rule specifies that articles identified by article identifiers A through M tend to be acquired together. The computer implemented method where the timing data indicating a time order of data items for the respective transactions of the set of transactions includes timing data indicating a time order of words in a sentence by a user of a messaging system, where the association rule specifies that words identified by word identifiers A through M tend to be acquired together. The computer implemented method where the timing data indicating a time order of data items for the respective transactions of the set of transactions includes timing data indicating a time order of acquisition of articles, where the association rule specifies that articles identified by article identifiers A through M tend to be acquired together, where the examining includes for respective transactions of the set of transactions in which articles identified by each of articles identified by article identifiers A through M is acquired, identifying a latest acquired article out of the articles identified by the article identifiers A through M. The computer implemented method where the timing data indicating a time order of data items for the respective transactions of the set of transactions includes timing data indicating a time order of words of a sentence by a user of a messaging system, where the association rule specifies that words identified by word identifiers A through M tend to be acquired together, where the examining includes for respective extracted transactions of the set of transactions provided by sentences in which words identified word identifiers A through M is included, identifying a latest acquired word out of the words identified by the word identifiers A through M. The computer implemented method where the timing data indicating a time order of data items for the respective transactions of the set of transactions includes timing data indicating a time order of words of a sentence by a user of a messaging system, where the predicted result is that a certain user will use a certain word in a sentence being formulated by the certain user, where the association rule specifies that words identified by word identifiers A through M tend to be acquired together, where the examining includes for respective extracted transactions of the set of transactions provided by sentences in which words identified word identifiers A through M is included, identifying a latest acquired word out of the words identified by the word identifiers A through M, where the action decision is an action decision to present a prompt on a user interface of a display of a user, where the prompt prompts the user to enter the certain word into a user interface being used by the certain user. The computer implemented method where the timing data indicating a time order of data items for the respective transactions of the set of transactions includes timing data indicating a time order of acquisition of articles, where the association rule specifies that articles identified by article identifiers A through M tend to be acquired together, where the examining includes for respective transactions of the set of transactions in which articles identified by each of article identifiers A through M is acquired, identifying a latest acquired article out of the articles identified by the article identifiers A through M, where the returning the sequence rule includes identifying which certain article identified by a certain article identifier of the article identifiers A through M is for the respective transactions of the set of transactions most frequently a last article acquired out of the articles identified by the article identifiers, and establishing an acquisition of an article identified by the certain article identifier as the predicted result of the sequence rule specifying the time sequenced premise and the predicted result. The computer implemented method where the timing data indicating a time order of data items for the respective transactions of the set of transactions includes timing data indicating a time order of acquisition of articles, where the association rule specifies that articles identified by article identifiers A through M tend to be acquired together, where the examining includes for respective transactions of the set of transactions in which articles identified by each of article identifiers A through M is acquired, identifying a latest acquired article out of the articles identified by the article identifiers A through M, where the predicted result is that a certain user will acquire an article identified by a certain identifier, where the returning the sequence rule includes identifying which certain article identified by the certain article identifier of the article identifiers A through M is for the respective transactions of the set of transactions most frequently a last article acquired out of the articles identified by the article identifiers, and establishing an acquisition of an article identified by the certain article identifier as the predicted result of the sequence rule specifying the time sequenced premise and the predicted result, and establishing the acquisition of articles identified by article identifiers of identifiers A through M other than the certain article identifier as a premise of the sequence rule specifying the time sequenced premise and the predicted result, so that according to the returned sequence rule, there is predicted that an article identified by the certain article identifier will be acquired subsequently by the a user on the condition that articles identified by the article identifiers A through M other than the certain article identifier are acquired, where the action decision includes an action decision to prompt the user to acquire an article identified by the certain article identifier. The computer implemented method where the timing data indicating a time order of data items for the respective transactions of the set of transactions includes timing data indicating a time order of acquisition of articles, where the association rule specifies that articles identified by article identifiers A through M tend to be acquired together, where the examining includes for respective transactions of the set of transactions in which articles identified by each of article identifiers A through M is acquired, identifying a latest acquired article out of the articles identified by the article identifiers A through M, where the predicted result is that a certain user will acquire an article identified by a certain identifier, where the returning the sequence rule includes identifying which certain article identified by the certain article identifier of the article identifiers A through M is for the respective transactions of the set of transactions most frequently a last article acquired out of the articles identified by the article identifiers, and establishing an acquisition of an article identified by the certain article identifier as the predicted result of the sequence rule specifying the time sequenced premise and the predicted result, and establishing the acquisition of articles identified by article identifiers of identifiers A through M other than the certain article identifier as a premise of the sequence rule specifying the time sequenced premise and the predicted result, so that according to the returned sequence rule, there is predicted that an article identified by the certain article identifier will be acquired subsequently by the a user on the condition that articles identified by the article identifiers A through M other than the certain article identifier are acquired, where the action decision includes an action decision to prompt the user to acquire an article identified by the certain article identifier, where the action decision further includes an action decision to increase a radio signal strength of a radio signal transmission to the user. The computer implemented method where the method includes recording the transaction dataset, where the recording includes receiving data from IOT sensors systems and client computer devices from users disposed at a plurality of different enterprise venues, and processing received data received from the IOT sensors and the client computer devices to associate acquisitions of articles to purchasing users performing the acquisitions, where the data of a plurality of transactions of the transaction dataset includes purchase transaction data, where the purchase transaction data includes for articles purchased, timestamps specifying a time of acquisition of the article within an enterprise venue of the plurality of enterprise venues by a purchasing user. The computer implemented method where the timing data indicating a time order of data items for the respective transactions of the set of transactions includes timing data indicating a time order of acquisition of articles, where the association rule specifies that articles identified by article identifiers A through M tend to be acquired together, where the examining includes for respective transactions of the set of transactions in which articles identified by each of article identifiers A through M is acquired, identifying a latest acquired article out of the articles identified by the article identifiers A through M, where the predicted result is that a certain user will acquire an article identified by a certain identifier, where the returning the sequence rule includes identifying which certain article identified by the certain article identifier of the article identifiers A through M is for the respective transactions of the set of transactions most frequently a last article acquired out of the articles identified by the article identifiers, and establishing an acquisition of an article identified by the certain article identifier as the predicted result of the sequence rule specifying the time sequenced premise and the predicted result, and establishing the acquisition of articles identified by article identifiers of identifiers A through M other than the certain article identifier as a premise of the sequence rule specifying the time sequenced premise and the predicted result, so that according to the returned sequence rule, there is predicted that an article identified by the certain article identifier will be acquired subsequently by the a user on the condition that articles identified by the article identifiers A through M other than the certain article identifier are acquired, where the action decision includes an action decision to prompt the user to acquire an article identified by the certain article identifier, where the action decision further includes an action decision to increase a radio signal strength of a radio signal transmission to the user, where the method includes recording the transaction dataset, where the recording includes receiving data from IOT sensors systems and client computer devices from users disposed at a plurality of different enterprise venues, and processing received data received from the IOT sensors and the client computer devices to associate acquisitions of articles to purchasing users performing the acquisitions, where the data of a plurality of transactions of the transaction dataset includes purchase transaction data, where the purchase transaction data includes for articles purchased, timestamps specifying a time of acquisition of the article within an enterprise venue of the plurality of enterprise venues by a purchasing user. Implementations of the described techniques may include hardware, a method or process, or computer software on a computer-accessible medium.

One general aspect includes a computer program product including: a computer readable storage medium readable by one or more processing circuit and storing instructions for execution by one or more processor for performing a method including: performing an association analysis on a transaction dataset to return an association rule, where the transaction dataset specifies data of a plurality of transactions, where respective transactions of the plurality of transactions include timing data indicating a time order of data items, where the association analysis is performed independent of the timing data indicating the time order of data items for the respective transactions of the plurality of transactions; extracting transaction data defining a set of transactions of the transaction dataset using the association rule, the transaction data including timing data indicating a time order of data items for respective transactions the set of transactions; examining data of the transaction data to identify for respective transactions of the set of transactions a certain data item of data items defining the respective transaction of the set of transactions, where the examining includes using the timing data indicating the time order of data items for respective transactions of the set of transactions; returning a time ordered sequence rule specifying a time ordered premise and predicted result, where the time ordered sequence rule is in dependence on the examining; monitoring activities of a user for occurrence of a condition defining the premise of the sequence rule; and returning an action decision in response an occurrence of the condition. Other embodiments of this aspect include corresponding computer systems, apparatus, and computer programs recorded on one or more computer storage devices, each configured to perform the actions of the methods.

One general aspect includes a system including: a memory; at least one processor in communication with memory; and program instructions executable by one or more processor via the memory to perform a method including: performing an association analysis on a transaction dataset to return an association rule, where the association analysis is performed independent of timing data indicating a time order of data items for the respective transactions; extracting transaction data defining a set of transactions of the transaction dataset using the association rule, the transaction data including timing data indicating a time order of data items for the set of transactions; examining data of the transaction data using the timing data indicating the time order of data items for transactions of the set of transaction; returning a time ordered sequence rule specifying a time ordered premise and predicted result, where the time ordered sequence rule is in dependence on the examining; monitoring activities of a user for occurrence of a condition defining the premise of the sequence rule; and returning an action decision in response an occurrence of the condition. Other embodiments of this aspect include corresponding computer systems, apparatus, and computer programs recorded on one or more computer storage devices, each configured to perform the actions of the methods.

Implementations may include one or more of the following features. The system where the timing data indicating a time order of data items for the respective transactions of the transaction dataset includes timing data indicating a time order of acquisition of articles by patron users of articles provided by an enterprise, where the predicted result is that a certain article will be acquired, where the action decision is an action decision to dispatch an autonomous article carrying apparatus to transport the certain article to a determined location of a certain user predicted to acquire the certain article. The system where the timing data indicating a time order of data items for the respective transactions of the transaction dataset includes timing data indicating a time order of acquisition of articles, where the association rule specifies that articles identified by article identifiers A through M tend to be acquired together, where the examining includes for respective transactions of the set of transactions in which articles identified by each of articles identified by article identifiers A through M is acquired, identifying a latest acquired article out of the articles identified by the article identifiers A through M. The system where the timing data indicating a time order of data items for the respective extracted transactions of the transaction dataset includes timing data indicating a time order of words of a sentence by a user of a messaging system, where the predicted result is that a certain user will use a certain word in a sentence being formulated by the certain user, where the association rule specifies that words identified by word identifiers A through M tend to be acquired together, where the examining includes for respective extracted transactions of the set of transactions provided by sentences in which words identified word identifiers A through M is included, identifying a latest acquired word out of the words identified by word identifiers A through M, where the action decision is an action decision to present a prompt on a user interface of a display of a user, where the prompt prompts the user to enter the certain word into a user interface being used by the certain user. The system where the method includes recording the transaction dataset, where the recording includes receiving data from IOT sensors systems and client computer devices from users disposed at a plurality of different enterprise venues, and processing received data received from the IOT sensors and the client computer devices to associate acquisitions of articles to purchasing users performing the acquisitions, where the data of a plurality of transactions of the transaction dataset includes purchase transaction data, where the purchase transaction data includes for articles purchased, timestamps specifying a time of acquisition of the article within an enterprise venue of a plurality of enterprise venues by a purchasing user. Implementations of the described techniques may include hardware, a method or process, or computer software on a computer-accessible medium.

FIGS. 7-10 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
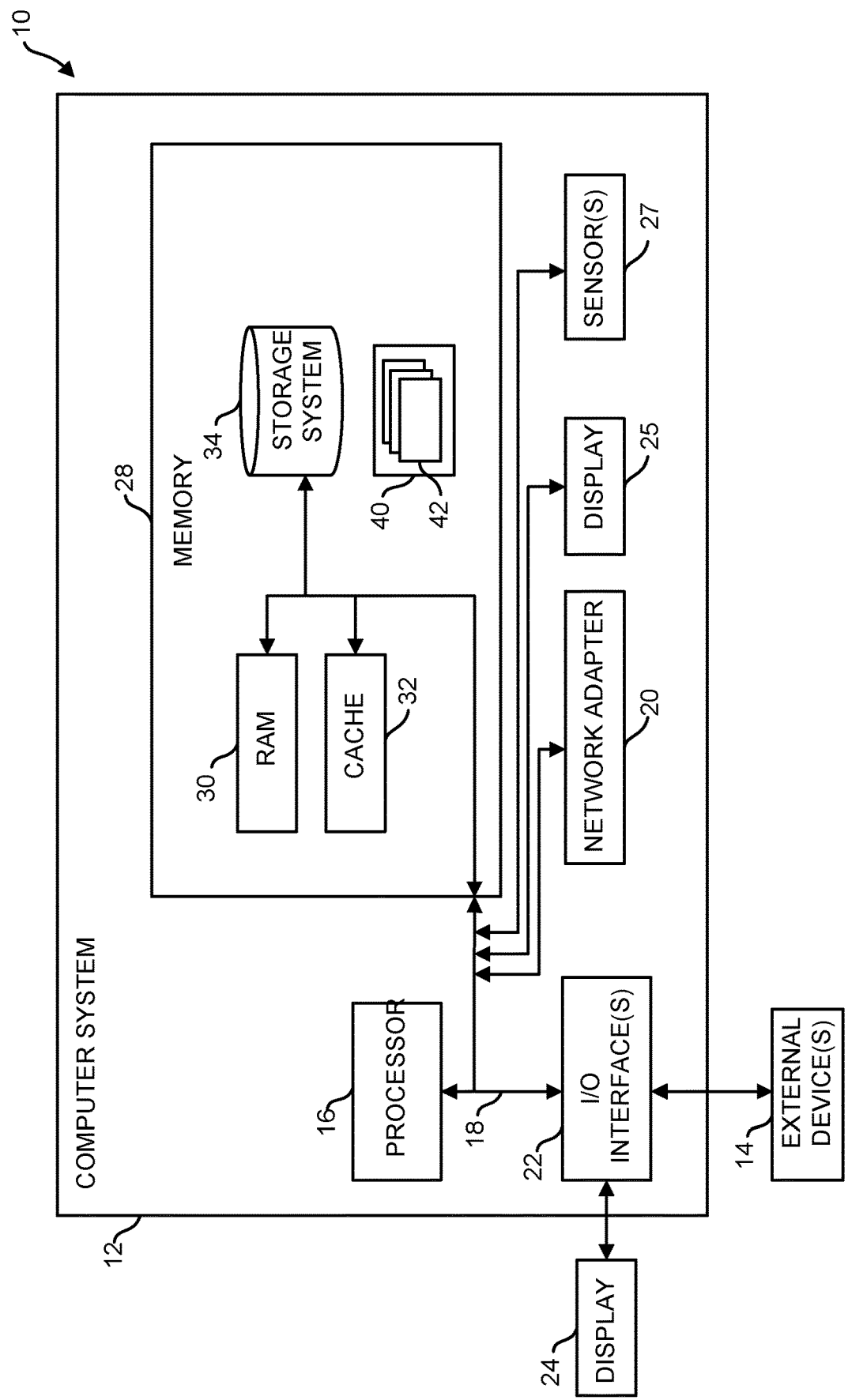
FIG. 7 depicts a computing node according to one embodiment.

Referring now to FIG. 7, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 7, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 8-9.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program article having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, manager system 110 can include one or more computing node 10 and can include one or more program 40 for performing functions described with reference to manager system 110 as set forth in the flowchart of FIG. 3. In one embodiment, client computer device 120A-120Z can include one or more computing node 10 and can include one or more program 40 for performing functions described with reference to client computer devices 120A-120Z as set forth in the flowchart of FIG. 3. In one embodiment, the computing node based systems and devices depicted in FIG. 1 can include one or more program for performing function described with reference to such computing node based systems and devices.

Figure 8:
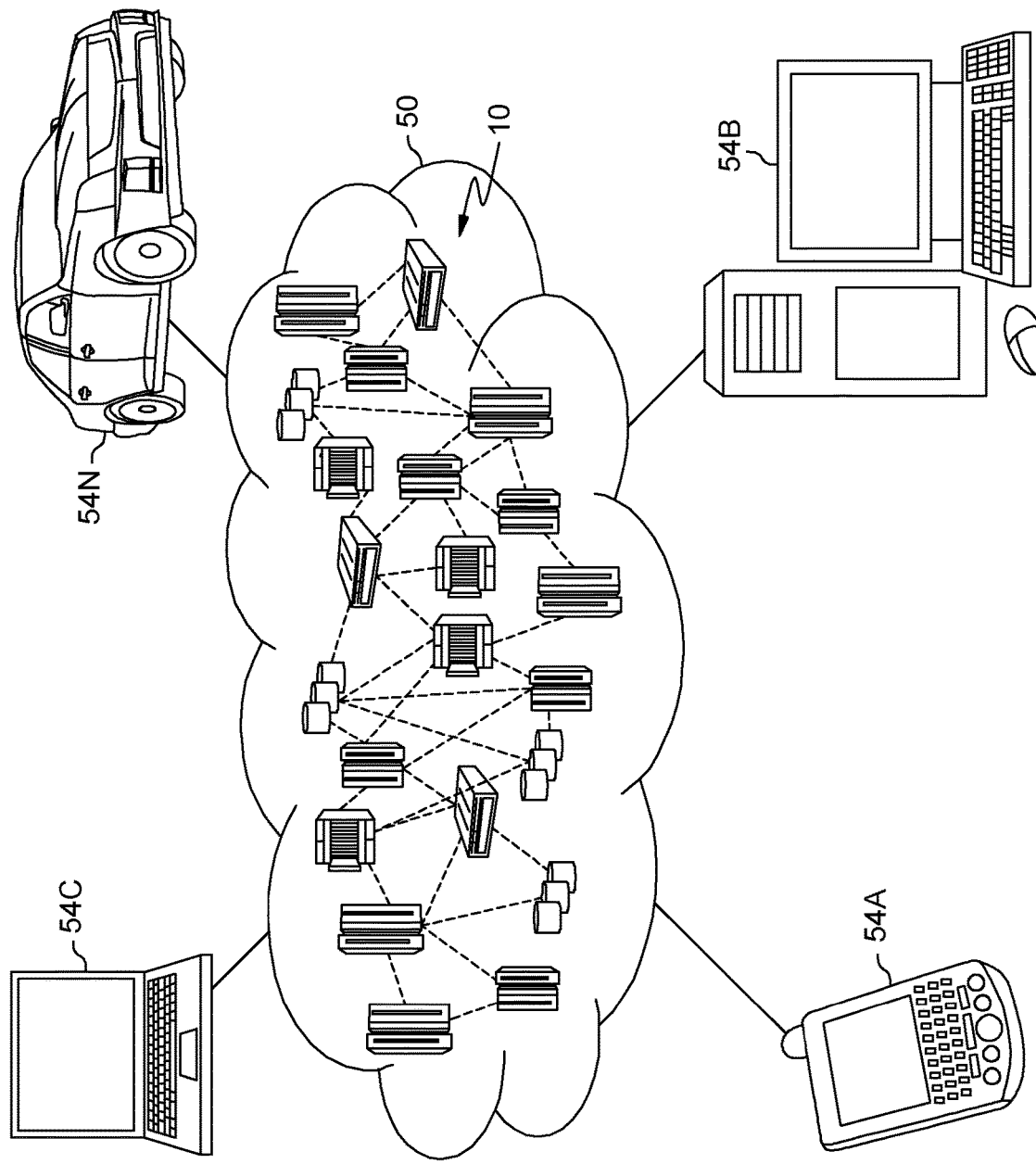
FIG. 8 depicts a cloud computing environment according to one embodiment.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 8 computing node 10 is described as being implemented in a cloud computing environment and accordingly is referred to as a cloud computing node in the context of FIG. 8.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
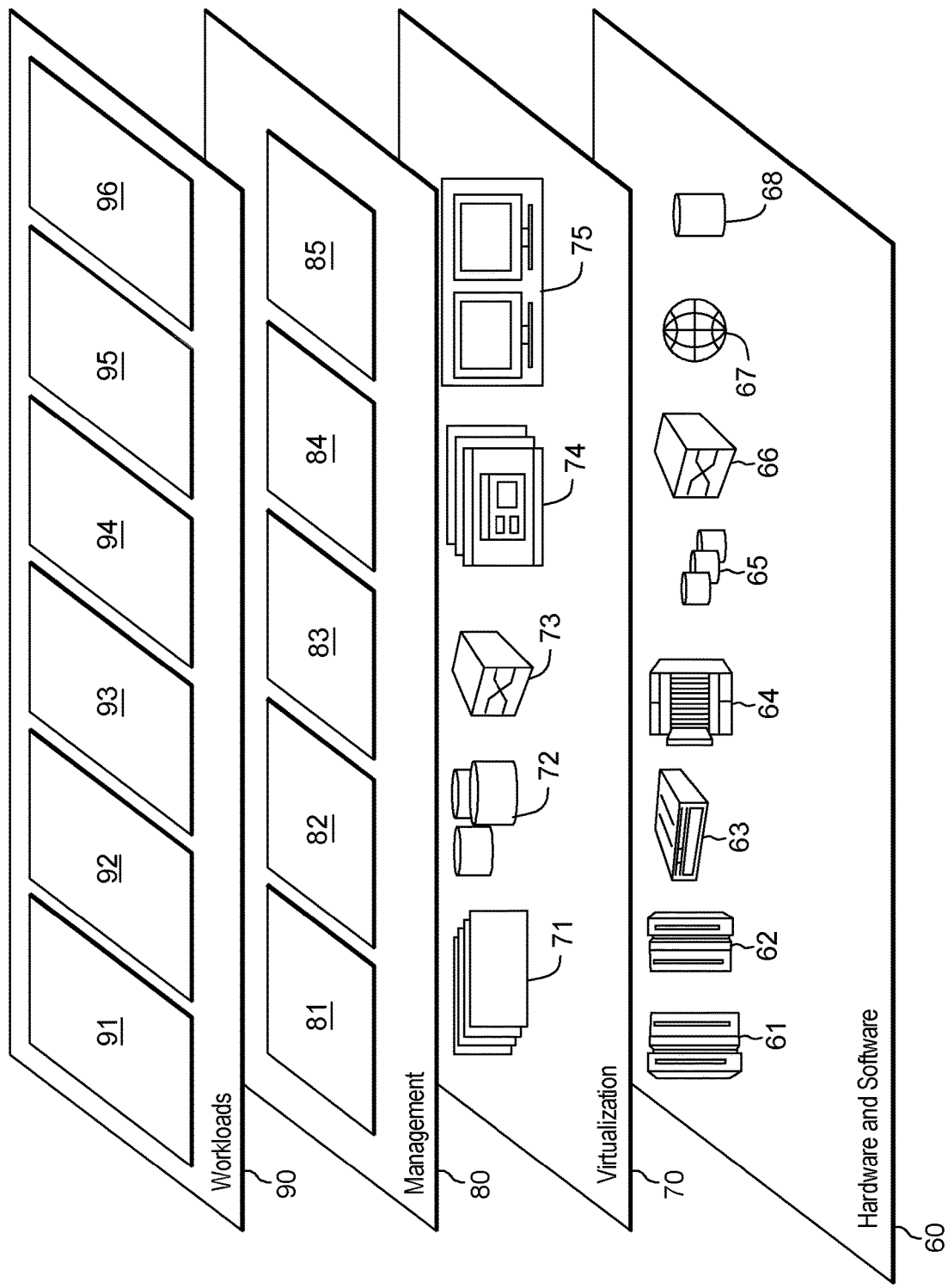
FIG. 9 depicts abstraction model layers according to one embodiment.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for generating and using rules for return of action decisions as set forth herein. The processing components 96 can be implemented with use of one or more program 40 described in FIG. 7.

The present invention may be a system, a method, and/or a computer program article. The computer program article may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program articles according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, articles and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method comprising:
performing an association analysis on a transaction dataset to return an association rule, wherein the transaction dataset specifies data of a plurality of transactions, wherein respective transactions of the plurality of transactions include timing data indicating a time order of data items, wherein the association analysis is performed independent of the timing data indicating the time order of data items for the respective transactions of the plurality of transactions;
extracting transaction data defining a set of transactions of the transaction dataset using the association rule, the transaction data including timing data indicating a time order of data items for respective transactions the set of transactions;
examining data of the transaction data to identify for respective transactions of the set of transactions a certain data item of data items defining the respective transaction of the set of transactions, wherein the examining includes using the timing data indicating the time order of data items for respective transactions of the set of transactions;
returning a time ordered sequence rule specifying a time ordered premise and predicted result, wherein the time ordered sequence rule is in dependence on the examining;
monitoring activities of a user for occurrence of a condition defining the premise of the sequence rule; and
returning an action decision in response to an occurrence of the condition.

2. The computer implemented method of claim 1, wherein the timing data indicating a time order of data items for the respective transactions of the set of transactions includes timing data indicating a time order of acquisition of articles.

3. The computer implemented method of claim 1, wherein the timing data indicating a time order of data items for the respective transactions of the set of transactions includes timing data indicating a time order of acquisition of articles by patron users of an enterprise that provides articles, wherein the action decision is an action decision to prompt a user to acquire an article of a certain classification located within a venue of the enterprise.

4. The computer implemented method of claim 1, wherein the timing data indicating a time order of data items for the respective transactions of the set of transactions includes timing data indicating a time order of acquisition of articles by patron users of articles provided by an enterprise, wherein the predicted result is that a certain article will be acquired, wherein the action decision is an action decision to dispatch an autonomous article carrying apparatus to transport the article to a determined location of a certain user predicted to acquire the certain article.

5. The computer implemented method of claim 1, wherein the timing data indicating a time order of data items for the respective transactions of the set of transactions includes timing data indicating a time order of acquisition of articles, wherein the association rule specifies that articles identified by article identifiers A through M tend to be acquired together.

6. The computer implemented method of claim 1, wherein the timing data indicating a time order of data items for the respective transactions of the set of transactions includes timing data indicating a time order of words in a sentence by a user of a messaging system, wherein the association rule specifies that words identified by word identifiers A through M tend to be acquired together.

7. The computer implemented method of claim 1, wherein the timing data indicating a time order of data items for the respective transactions of the set of transactions includes timing data indicating a time order of acquisition of articles, wherein the association rule specifies that articles identified by article identifiers A through M tend to be acquired together, wherein the examining includes for respective transactions of the set of transactions in which articles identified by each of articles identified by article identifiers A through M is acquired, identifying a latest acquired article out of the articles identified by the article identifiers A through M.

8. The computer implemented method of claim 1, wherein the timing data indicating a time order of data items for the respective transactions of the set of transactions includes timing data indicating a time order of words of a sentence by a user of a messaging system, wherein the association rule specifies that words identified by word identifiers A through M tend to be acquired together, wherein the examining includes for respective extracted transactions of the set of transactions provided by sentences in which words identified word identifiers A through M is included, identifying a latest acquired word out of the words identified by the word identifiers A through M.

9. The computer implemented method of claim 1, wherein the timing data indicating a time order of data items for the respective transactions of the set of transactions includes timing data indicating a time order of words of a sentence by a user of a messaging system, wherein the predicted result is that a certain user will use a certain word in a sentence being formulated by the certain user, wherein the association rule specifies that words identified by word identifiers A through M tend to be acquired together, wherein the examining includes for respective extracted transactions of the set of transactions provided by sentences in which words identified word identifiers A through M is included, identifying a latest acquired word out of the words identified by the word identifiers A through M, wherein the action decision is an action decision to present a prompt on a user interface of a display of a user, wherein the prompt prompts the user to enter the certain word into a user interface being used by the certain user.

10. The computer implemented method of claim 1, wherein the timing data indicating a time order of data items for the respective transactions of the set of transactions includes timing data indicating a time order of acquisition of articles, wherein the association rule specifies that articles identified by article identifiers A through M tend to be acquired together, wherein the examining includes for respective transactions of the set of transactions in which articles identified by each of article identifiers A through M is acquired, identifying a latest acquired article out of the articles identified by the article identifiers A through M, wherein the returning the sequence rule includes identifying which certain article identified by a certain article identifier of the article identifiers A through M is for the respective transactions of the set of transactions most frequently a last article acquired out of the articles identified by the article identifiers, and establishing an acquisition of an article identified by the certain article identifier as the predicted result of the sequence rule specifying the time sequenced premise and the predicted result.

11. The computer implemented method of claim 1, wherein the timing data indicating a time order of data items for the respective transactions of the set of transactions includes timing data indicating a time order of acquisition of articles, wherein the association rule specifies that articles identified by article identifiers A through M tend to be acquired together, wherein the examining includes for respective transactions of the set of transactions in which articles identified by each of article identifiers A through M is acquired, identifying a latest acquired article out of the articles identified by the article identifiers A through M, wherein the predicted result is that a certain user will acquire an article identified by a certain identifier, wherein the returning the sequence rule includes identifying which certain article identified by the certain article identifier of the article identifiers A through M is for the respective transactions of the set of transactions most frequently a last article acquired out of the articles identified by the article identifiers, and establishing an acquisition of an article identified by the certain article identifier as the predicted result of the sequence rule specifying the time sequenced premise and the predicted result, and establishing the acquisition of articles identified by article identifiers of identifiers A through M other than the certain article identifier as a premise of the sequence rule specifying the time sequenced premise and the predicted result, so that according to the returned sequence rule, there is predicted that an article identified by the certain article identifier will be acquired subsequently by the a user on the condition that articles identified by the article identifiers A through M other than the certain article identifier are acquired, wherein the action decision includes an action decision to prompt the user to acquire an article identified by the certain article identifier.

12. The computer implemented method of claim 1, wherein the timing data indicating a time order of data items for the respective transactions of the set of transactions includes timing data indicating a time order of acquisition of articles, wherein the association rule specifies that articles identified by article identifiers A through M tend to be acquired together, wherein the examining includes for respective transactions of the set of transactions in which articles identified by each of article identifiers A through M is acquired, identifying a latest acquired article out of the articles identified by the article identifiers A through M, wherein the predicted result is that a certain user will acquire an article identified by a certain identifier, wherein the returning the sequence rule includes identifying which certain article identified by the certain article identifier of the article identifiers A through M is for the respective transactions of the set of transactions most frequently a last article acquired out of the articles identified by the article identifiers, and establishing an acquisition of an article identified by the certain article identifier as the predicted result of the sequence rule specifying the time sequenced premise and the predicted result, and establishing the acquisition of articles identified by article identifiers of identifiers A through M other than the certain article identifier as a premise of the sequence rule specifying the time sequenced premise and the predicted result, so that according to the returned sequence rule, there is predicted that an article identified by the certain article identifier will be acquired subsequently by the a user on the condition that articles identified by the article identifiers A through M other than the certain article identifier are acquired, wherein the action decision includes an action decision to prompt the user to acquire an article identified by the certain article identifier, wherein the action decision further includes an action decision to increase a radio signal strength of a radio signal transmission to the user.

13. The computer implemented method of claim 1, wherein the method includes recording the transaction dataset, wherein the recording includes receiving data from Internet of Things (IOT) sensors systems and client computer devices from users disposed at a plurality of different enterprise venues, and processing received data received from the IOT sensors and the client computer devices to associate acquisitions of articles to purchasing users performing the acquisitions, wherein the data of a plurality of transactions of the transaction dataset includes purchase transaction data, wherein the purchase transaction data includes for articles purchased, timestamps specifying a time of acquisition of the article within an enterprise venue of the plurality of enterprise venues by a purchasing user.

14. The computer implemented method of claim 1, wherein the timing data indicating a time order of data items for the respective transactions of the set of transactions includes timing data indicating a time order of acquisition of articles, wherein the association rule specifies that articles identified by article identifiers A through M tend to be acquired together, wherein the examining includes for respective transactions of the set of transactions in which articles identified by each of article identifiers A through M is acquired, identifying a latest acquired article out of the articles identified by the article identifiers A through M, wherein the predicted result is that a certain user will acquire an article identified by a certain identifier, wherein the returning the sequence rule includes identifying which certain article identified by the certain article identifier of the article identifiers A through M is for the respective transactions of the set of transactions most frequently a last article acquired out of the articles identified by the article identifiers, and establishing an acquisition of an article identified by the certain article identifier as the predicted result of the sequence rule specifying the time sequenced premise and the predicted result, and establishing the acquisition of articles identified by article identifiers of identifiers A through M other than the certain article identifier as a premise of the sequence rule specifying the time sequenced premise and the predicted result, so that according to the returned sequence rule, there is predicted that an article identified by the certain article identifier will be acquired subsequently by the a user on the condition that articles identified by the article identifiers A through M other than the certain article identifier are acquired, wherein the action decision includes an action decision to prompt the user to acquire an article identified by the certain article identifier, wherein the action decision further includes an action decision to increase a radio signal strength of a radio signal transmission to the user, wherein the method includes recording the transaction dataset, wherein the recording includes receiving data from Internet of Things (IOT) sensors systems and client computer devices from users disposed at a plurality of different enterprise venues, and processing received data received from the IOT sensors and the client computer devices to associate acquisitions of articles to purchasing users performing the acquisitions, wherein the data of a plurality of transactions of the transaction dataset includes purchase transaction data, wherein the purchase transaction data includes for articles purchased, timestamps specifying a time of acquisition of the article within an enterprise venue of the plurality of enterprise venues by a purchasing user.

15. A computer program product comprising:
a computer readable storage medium readable by one or more processing circuit and storing instructions for execution by one or more processor for performing a method comprising:
- performing an association analysis on a transaction dataset to return an association rule, wherein the transaction dataset specifies data of a plurality of transactions, wherein respective transactions of the plurality of transactions include timing data indicating a time order of data items, wherein the association analysis is performed independent of the timing data indicating the time order of data items for the respective transactions of the plurality of transactions,
- extracting transaction data defining a set of transactions of the transaction dataset using the association rule, the transaction data including timing data indicating a time order of data items for respective transactions of the set of transactions;
- examining data of the transaction data to identify for respective transactions of the set of transactions a certain data item of data items defining the respective transaction of the set of transactions, wherein the examining includes using the timing data indicating the time order of data items for respective transactions of the set of transactions, wherein the timing data indicating a time order of data items for the respective transactions of the set of transactions includes timing data indicating a time order of acquisition of articles, wherein the association rule specifies that articles identified by article identifiers A through M tend to be acquired together, wherein the examining includes for respective transactions of the set of transactions in which articles identified by each of article identifiers A through M is acquired, identifying a latest acquired article out of the articles identified by the article identifiers A through M;
- returning a time ordered sequence rule specifying a time ordered premise and predicted result, wherein the time ordered sequence rule is in dependence on the examining, wherein the returning the sequence rule includes identifying which certain article identified by a certain article identifier of the article identifiers A through M is for the respective transactions of the set of transactions most frequently a last article acquired out of the articles identified by the article identifiers, and establishing an acquisition of an article identified by the certain article identifier as the predicted result of the sequence rule specifying the time sequenced premise and the predicted result;
- monitoring activities of a user for occurrence of a condition defining the premise of the sequence rule; and
- returning an action decision in response to an occurrence of the condition.

16. A system comprising:
a memory;
at least one processor in communication with memory; and
program instructions executable by one or more processor via the memory to perform a method comprising:
- performing an association analysis on a transaction dataset to return an association rule, wherein the association analysis is performed independent of timing data indicating a time order of data items for the respective transactions;
- extracting transaction data defining a set of transactions of the transaction dataset using the association rule, the transaction data including timing data indicating a time order of data items for the set of transactions;
- examining data of the transaction data using the timing data indicating the time order of data items for transactions of the set of transaction, wherein the timing data indicating a time order of data items for the respective transactions of the set of transactions includes timing data indicating a time order of words of a sentence by a user of a messaging system, wherein the association rule specifies that words identified by word identifiers A through M tend to be acquired together, wherein the examining includes for respective extracted transactions of the set of transactions provided by sentences in which words identified word identifiers A through M is included, identifying a latest acquired word out of the words identified by the word identifiers A through M;
- returning a time ordered sequence rule specifying a time ordered premise and predicted result, wherein the time ordered sequence rule is in dependence on the examining;
- monitoring activities of a user respecting use of a user interface for occurrence of a condition defining the premise of the sequence rule; and
- returning an action decision in response to an occurrence of the condition, the action decision causing presentment on the user interface of a predicted word predicted to be entered into the user interface by the user.

17. The computer implemented method of claim 1, wherein extracting transaction data defining the set of transactions of the transaction dataset using the association rule includes performing the extracting so that the extracted transaction data defining the set of extractions defines a reduced set of data relative to the transaction dataset.

18. The computer implemented method of claim 1, wherein the monitoring activities of the user for occurrence of a condition defining the premise of the sequence rule includes monitoring article acquisitions of the user, wherein the action decision causes deployment of a mechanical robot for delivery of a predicted article predicted to be acquired by the user.

19. The system of claim 16, wherein the monitoring and the presentment are performed while user is using the user interface to input text.

* * * * *